US009259688B2

(12) United States Patent
Shimizu et al.

(10) Patent No.: US 9,259,688 B2
(45) Date of Patent: Feb. 16, 2016

(54) METHOD FOR REDUCING NITROGEN OXIDE FROM INTERNAL COMBUSTION ENGINE AND APPARATUS THEREFOR

(75) Inventors: Atsushi Shimizu, Tokyo (JP); Hirokazu Ohno, Tokyo (JP); Tomohiro Niihama, Tokyo (JP); Masahiro Tsukamoto, Tokyo (JP); Yohsuke Koizumi, Kawasaki (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 615 days.

(21) Appl. No.: 13/322,272

(22) PCT Filed: May 26, 2010

(86) PCT No.: PCT/JP2010/058935
§ 371 (c)(1),
(2), (4) Date: Jan. 12, 2012

(87) PCT Pub. No.: WO2010/137628
PCT Pub. Date: Dec. 2, 2010

(65) Prior Publication Data
US 2012/0125286 A1 May 24, 2012

(30) Foreign Application Priority Data

May 26, 2009 (JP) ................. 2009-126745
Mar. 29, 2010 (JP) ................. 2010-076269
Mar. 30, 2010 (JP) ................. 2010-079686

(51) Int. Cl.
*F02M 25/00* (2006.01)
*B01D 63/14* (2006.01)
(Continued)

(52) U.S. Cl.
CPC ............ *B01D 63/14* (2013.01); *B01D 63/02* (2013.01); *B01D 63/08* (2013.01); *F02M 25/028* (2013.01);
(Continued)

(58) Field of Classification Search
CPC ... F02M 2700/34; F02M 1/16; F02M 25/022; F02B 47/02
USPC ............. 123/25 R, 585, 26, 704; 60/274
See application file for complete search history.

(56) References Cited

U.S. PATENT DOCUMENTS 5,960,777 A * 10/1999 Nemser et al. ............. 123/585
6,478,852 B1 11/2002 Callaghan et al.
(Continued)

FOREIGN PATENT DOCUMENTS

EP 1669590 A1 6/2006
GB 2139110 A 11/1984
(Continued)

OTHER PUBLICATIONS

Office Action issued in corresponding Chinese Patent Application No. 201080022816.4 dated Apr. 1, 2013.
(Continued)

*Primary Examiner* — Hung Q Nguyen
*Assistant Examiner* — Omar Morales
(74) *Attorney, Agent, or Firm* — Morgan, Lewis & Bockius LLP

(57) ABSTRACT

Provided are a method for reducing a nitrogen oxide in an exhaust gas from an internal combustion engine, a membrane module, an apparatus for reducing a nitrogen oxide from an internal combustion engine using the membrane module, and an internal combustion engine apparatus. A method for reducing a nitrogen oxide in an exhaust gas from an internal combustion engine, the method comprising: a step of bringing pressurized air into contact with one surface of a steam permeable membrane (11), and allowing water to flow along the other surface of the steam permeable membrane (11) to moisturize the pressurized air; and a step of introducing the moisturized air into the internal combustion engine.

17 Claims, 14 Drawing Sheets

(51) Int. Cl.
  *F02M 33/00* (2006.01)
  *F02M 35/10* (2006.01)
  *B01D 63/02* (2006.01)
  *B01D 63/08* (2006.01)
  *F02M 25/032* (2006.01)
  *F02M 25/022* (2006.01)
  *F02M 25/028* (2006.01)
  *F02B 37/00* (2006.01)

(52) U.S. Cl.
  CPC ......... *F02M 25/0225* (2013.01); *F02M 25/032* (2013.01); *F02M 33/00* (2013.01); *F02M 35/10301* (2013.01); *F02M 35/10334* (2013.01); *F02B 37/00* (2013.01); *Y02T 10/121* (2013.01)

(56) References Cited

U.S. PATENT DOCUMENTS

| | | | |
|---|---|---|---|
| 6,511,052 B1* | 1/2003 | Tonkin et al. | 261/101 |
| 6,526,950 B2* | 3/2003 | Ito et al. | 123/518 |
| 2003/0015185 A1* | 1/2003 | Dutart | 123/585 |
| 2006/0118478 A1 | 6/2006 | Linhart et al. | |
| 2007/0287036 A1* | 12/2007 | Kondo et al. | 429/13 |

FOREIGN PATENT DOCUMENTS

| | | |
|---|---|---|
| JP | 3-61658 | 3/1991 |
| JP | 3-202668 | 9/1991 |
| JP | H07-208775 A | 8/1995 |
| JP | 2003-522634 | 7/2003 |
| JP | 2007-016792 | 1/2007 |
| JP | 2007-196130 A | 8/2007 |
| JP | 2007-222841 | 9/2007 |
| JP | 2007-222841 A | 9/2007 |
| JP | 2012-013089 A | 1/2012 |
| WO | 95/23286 A1 | 8/1995 |
| WO | 01/11216 A2 | 2/2001 |

OTHER PUBLICATIONS

Yokomura, EGR System in Turbocharged and Intercooled HD Diesel Engine-Expansion of EGR Area with Venturi EGR System-, Technical Papers, 15, pp. 18-24, 2003 (See English abstract).

Hupli, Hurnidift ton Methods for Reduction of NOx Emissions, CIMAC Congress, 112, pp. 1-18, 2004.

Maeda, Influence of Dilution Ration on PM Emission Data, Journal of the JIME, 38, pp. 37-41, 2003 (See English abstract).

Technical Code (2008) on Control of Emission of Nitrogen Oxides from Marine Diesel Engines (Rev. 0). Nippon Kaiji Kyokai, 2009.

International Search Report for PCT/JP2010/058935.

Search Report issued in corresponding European Patent Application No. 10780583.0 dated May 8, 2013.

Office Action issued in Japanese Patent Application No. 2011-516044 dated Oct. 3, 2012.

* cited by examiner

METHOD FOR REDUCING NITROGEN OXIDE FROM INTERNAL COMBUSTION ENGINE AND APPARATUS THEREFOR

CROSS-REFERENCE TO RELATED APPLICATIONS

The present application is a U.S. National Phase Application of International Application PCT/JP2010/058935 filed May 26, 2010, which claims the benefit of Japanese Patent Application Nos. 2009-126745, filed May 26, 2009, 2010-076269, filed Mar. 29, 2010, and 2010-079686, filed Mar. 30, 2010, which are hereby incorporated by reference in their entirety.

TECHNICAL FIELD

The present invention relates to a method for reducing a nitrogen oxide from an internal combustion engine, and an apparatus for reducing a nitrogen oxide from an internal combustion engine. More specifically, the present invention relates to a method for reducing a nitrogen oxide in an exhaust gas from an internal combustion engine, a membrane module used in the method, an apparatus for reducing a nitrogen oxide from an internal combustion engine, and an internal combustion engine apparatus.

BACKGROUND ART

Internal combustion engines such as diesel engines are widely used in a variety of fields for high combustion efficiency and a small amount of carbon dioxide to be produced. Unfortunately, the exhaust gas from those internal combustion engines includes nitrogen oxides (hereinafter, referred to as NOx.). NOx emission has been regulated more severely because of increasing environmental concerns these days. For this reason, development of techniques of removing NOx with high efficiency and at low cost has been demanded, and NOx reduction has been examined in various respects (see Non Patent Documents 1 and 2).

Specific examples of the techniques of removing NOx include a selective catalytic reduction (SCR) technique that selectively reduces NOx in the exhaust gas from a diesel engine by a catalyst. The SCR technique, however, needs chemicals such as urea and ammonia for reduction of NOx, and has problems such as management of the chemicals and expensive cost. Additionally, in the case where the exhaust gas has a high NOx concentration of hundreds to thousands ppm, an apparatus as large as the diesel engine body is necessary.

Another example proposes that the feed air having water sprayed thereto is fed to an internal combustion engine to reduce NOx (see Patent Document 1). Moreover, a method for adding water to a fuel and feeding the resulting fuel as a W/O (Water/Oil) emulsion to an engine or the like is also proposed.

Further, a method for reducing NOx using a membrane is proposed. For example, Patent Document 2 describes reduction of NOx in which using an oxygen selectively permeable membrane, a concentration of nitrogen in the air is enriched, and the nitrogen-enriched air is fed to an internal combustion engine. Patent Document 3 describes reduction of NOx in which using a steam permeable membrane, steam is permeated from the discharge air, and the permeated steam is fed to feed air.

PATENT DOCUMENT

Patent Document 1
Japanese Patent Laid-Open No. 03-202668
Patent Document 2
National Publication of International Patent Application No. 2003-522634
Patent Document 3
Japanese Patent Laid-Open No. 03-61658

NON PATENT DOCUMENT

Non Patent Document 1
Yokomura, "EGR System in a Turbocharged and Intercooled HD Diesel Engine," Mitsubishi Fuso Technical Review, 2003, No. 15, p. 18 to p. 24
Non Patent Document 2
J. Hupli, "Humidification method for reduction of NOx emission," CIMAC Congress, 2004, No. 11

SUMMARY OF THE INVENTION

Problems to be Solved by the Invention

In the method for feeding the feed air having water sprayed thereto to the internal combustion engine, however, water droplets are likely to remain in the moisturized feed air. Additionally, the feed air is a saturated steam, and condensation is likely to occur even by a slight change in temperature even after the water droplets are removed. If the air is used as the feed air to the internal combustion engine, water droplets may corrode the combustion chamber of the internal combustion engine.

Moreover, in the method for adding water to a fuel and feeding it as a W/O emulsion to an engine or the like, addition of water increases the viscosity of the fuel. For this, an amount of water to be added must be limited.

In order to solve these problems, a method for reducing NOx using the membrane above has been examined, but the examination is insufficient yet. In the method described in Patent Document 1, NOx reduction is insufficient. The method cannot meet the NOx emission standards (Tier III) by the International Maritime Organization (IMO) with effect from 2016, for example. Tier III is made severer than the current standards Tier I so that NOx is reduced 80% based on the standards of Tier I. In the method described in Patent Document 2, insufficient moisturization of the air leads to an insufficient NOx reduction effect. For this, the method cannot meet Tier III. The method also has difficulties in control of the temperature and humidity of the air.

The present invention has been made in consideration of the circumstances above, and an object of the present invention is to provide a method for reducing a nitrogen oxide in an exhaust gas from an internal combustion engine, a membrane module, an apparatus for reducing a nitrogen oxide for an internal combustion engine using the membrane module, and an internal combustion engine apparatus.

Means for Solving the Problems

As a result of extensive research in order to solve the problems, the present inventors found out that pressurized air is brought into contact with one surface of a steam permeable membrane, and water is allowed to flow along the other surface of the steam permeable membrane to moisturize the pressurized air; the moisturized air is introduced into an internal combustion engine; as a result, NOx can be reduced more significantly than in the conventional method. Thus, the present invention has been completed.

Namely, the present invention is as follows.

[1]

A method for reducing a nitrogen oxide in an exhaust gas from an internal combustion engine, the method comprising:

a step of bringing pressurized air into contact with one surface of a steam permeable membrane, and allowing water to flow along the other surface of the steam permeable membrane to moisturize the pressurized air; and a step of introducing the moisturized air into the internal combustion engine.

[2]

The method for reducing the nitrogen oxide according to [1], wherein the water is pressurized at a pressure equal to or higher than that applied to the pressurized air.

[3]

The method for reducing the nitrogen oxide according to [1] or [2], wherein a direction of the air flowing over the one surface of the steam permeable membrane is opposed to a direction of the water flowing over the other surface of the steam permeable membrane.

[4]

The method for reducing the nitrogen oxide according to any one of [1] to [3], further comprising a step of nitrogen-enriching the air using a nitrogen-enriching membrane.

[5]

A method for reducing a nitrogen oxide in an exhaust gas from an internal combustion engine, the method comprising:

a step of bringing pressurized air into contact with one surface of a moisturizing nitrogen-enriching membrane to nitrogen-enrich the pressurized air, and allowing water to flow along the other surface of the moisturizing nitrogen-enriching membrane to moisturize the pressurized air; and a step of introducing the nitrogen-enriched and moisturized air into the internal combustion engine.

[6]

The method for reducing the nitrogen oxide according to [5], wherein a pressure of the water is the same as or lower than that of the pressurized air.

[7]

The method for reducing the nitrogen oxide according to [5] or [6], wherein a pressure in a region through which the water flows is reduced to allow the water to flow.

[8]

The method for reducing the nitrogen oxide according to any one of [4] to [7], wherein a concentration of oxygen in the nitrogen-enriched and moisturized air is not more than 20 mol %.

[9]

The method for reducing the nitrogen oxide according to any one of [5] to [8], wherein a direction of the pressurized air flowing over the one surface of the moisturizing nitrogen-enriching membrane is opposed to a direction of the water flowing over the other surface of the moisturizing nitrogen-enriching membrane.

[10]

The method for treating air according to any one of [1] to [9], wherein the water is steam.

[11]

The method for reducing the nitrogen oxide from an internal combustion engine according to any one of [1] to [10], wherein the water comprises an electrolyte.

[12]

The method for reducing the nitrogen oxide from an internal combustion engine according to any one of [1] to [11], wherein the water comprises sodium chloride.

[13]

The method for reducing the nitrogen oxide according to any one of [1] to [12], wherein a temperature of the water is −10° C. to +30° C. of a temperature of the pressurized air.

[14]

The method for reducing the nitrogen oxide according to [10], wherein the steam is allowed to flow by an exhaust gas discharged from the internal combustion engine.

[15]

The method for reducing the nitrogen oxide according to any one of [1] to [14], wherein a content of water in the moisturized air or the nitrogen-enriched moisturized air is not less than 1 mol %, and a humidity of the moisturized air is less than 100% RH.

[16]

The method for reducing the nitrogen oxide according to any one of [1] to [15], wherein the water is circulated and used.

[17]

A membrane module comprising a steam permeable membrane, and a housing that accommodates the steam permeable membrane, wherein an inside of the housing is partitioned by the steam permeable membrane to form a first space and a second space; and the housing comprises:

an air feeding port that feeds air to the first space;

an air discharging port that discharges the air from the first space;

a water feeding port that feeds water to the second space; and a water discharging port that discharges the water from the second space.

[18]

The membrane module according to [17], wherein the steam permeable membrane is a moisturizing nitrogen-enriching membrane.

[19]

The membrane module according to [17] or [18], wherein the membrane module is a hollow fiber membrane type membrane module or a flat sheet membrane type membrane module.

[20]

An apparatus for reducing a nitrogen oxide from an internal combustion engine, the apparatus comprising:

a membrane module according to any one of [17] to [19];

an air feeding portion that feeds pressurized air to the air feeding port of the membrane module; and a water feeding portion that feeds water to the water feeding port of the membrane module; wherein treated air discharged from the air discharging port of the membrane module is fed to a combustion chamber of the internal combustion engine.

[21]

The apparatus for reducing the nitrogen oxide from an internal combustion engine according to [20], wherein the water feeding portion has a liquid transfer portion that feeds the water discharged from the water discharging port of the membrane module again to the water feeding port of the membrane module.

[22]

The apparatus for reducing the nitrogen oxide from an internal combustion engine according to [20] or [21], the apparatus further comprising:

a temperature control unit that controls a temperature of the water; and a flow rate control unit that controls a flow rate of the water.

[23]
An internal combustion engine apparatus comprising:
an apparatus for reducing a nitrogen oxide from an internal combustion engine according to any one of [20] to [22]; and
a combustion chamber to which the treated air treated by the apparatus for reducing the nitrogen oxide is fed.

Advantageous Effect of the Invention

According to a method for reducing a nitrogen oxide in an exhaust gas from an internal combustion engine, membrane module, apparatus for reducing a nitrogen oxide from an internal combustion engine using the membrane, and internal combustion engine apparatus according to the present invention, NOx in the exhaust gas from the internal combustion engine can be reduced.

MODES FOR CARRYING OUT THE INVENTION

Figure 1:
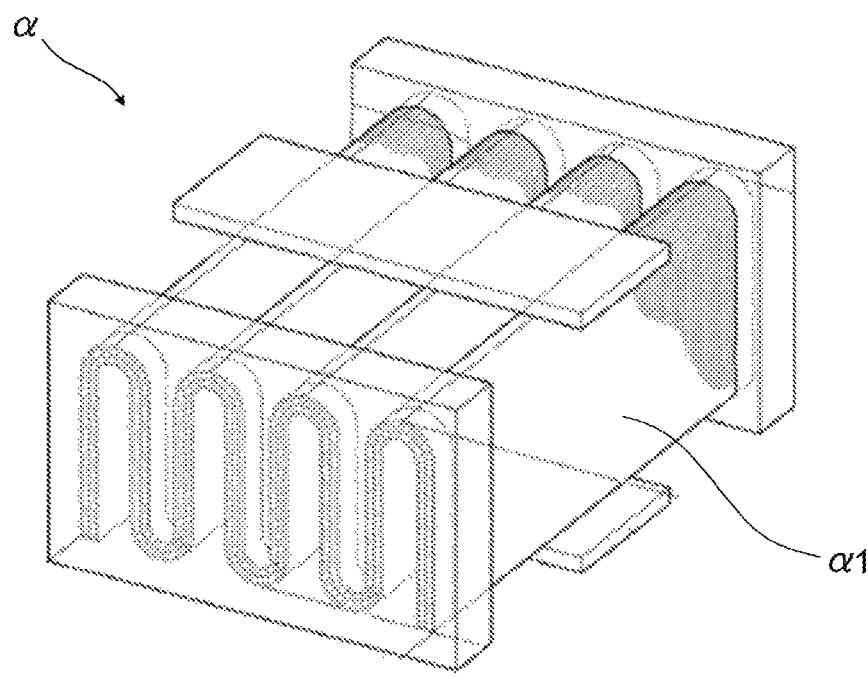
FIG. 1 shows a perspective view of one embodiment of a membrane module according to the present embodiment.

Hereinafter, an embodiment of the present invention (hereinafter, simply referred to as "the present embodiment.") will be described in detail with reference to the drawings when necessary. The present embodiment below is an example for describing the present invention, and the present invention will not be limited to the content below. The accompanied drawings also show an example of the embodiment, and the present embodiment will not be limited thereto. The present invention can be properly modified within the gist, and implemented. In the drawings, vertical and horizontal positional relations are based on the positional relations shown in the drawing unless otherwise specified, and the ratio of the dimension in the drawing is not limited to the ratio shown.

A method for reducing a nitrogen oxide from an internal combustion engine according to the present embodiment is a method for reducing a nitrogen oxide in an exhaust gas from an internal combustion engine, and comprises:
a step of bringing pressurized air into contact with one surface of a steam permeable membrane, and allowing water to flow along the other surface of the steam permeable membrane to moisturize the pressurized air, and
a step of introducing the moisturized air into the internal combustion engine. The pressurized air to be introduced into the internal combustion engine is moisturized. Thereby, nitrogen oxides produced during combustion in the internal combustion engine can be reduced. Specifically, in the method, the pressurized air is brought into contact with one surface of a steam permeable membrane, and water is allowed to flow along the other surface of the steam permeable membrane to moisturize the pressurized air, and the moisturized air is fed to the internal combustion engine.

Use of the moisturized air as feed air for the internal combustion engine can reduce NOx to be produced. Although the mechanism is not clear, it is presumed that NOx to be produced can be reduced because of (1) and (2) below (however, the action of the present embodiment is not limited to these).
(1) The air used for combustion contains steam. Thereby, the concentration of oxygen in the air can be reduced to suppress a combustion reaction, leading to reduction in a combustion temperature. For this reason, a side reaction to produce NOx can be suppressed.
(2) Water, which is a triatomic molecule, has a relatively high specific heat, can reduce a heat generating temperature during combustion. For this reason, a side reaction to produce NOx can be suppressed.

The concentration of the component such as oxygen, nitrogen, carbon dioxide gas, and carbon monoxide in the used air is not particularly limited, and, for example, the air prepared by mixing air with an exhaust gas and the like to adjust each component can be used. The pressurized air is brought into contact with one surface of a steam permeable membrane described later. At this time, the water flowing over the other surface of the steam permeable membrane permeates through the steam permeable membrane to moisturize the pressurized air. In the present embodiment, the pressurized air is brought into contact with the steam permeable membrane. Thereby, the air can be moisturized while steam permeability of the membrane can be kept high, leading to efficient moisturization of the air.

In the method for reducing the nitrogen oxide according to the present embodiment, the air is moisturized through the steam permeable membrane. Accordingly, the moisturized air includes no water droplets. From the viewpoint of preventing condensation from occurring in the moisturized air by a slight change in the temperature, the humidity is preferably less than 100% RH, and more preferably not more than 95% RH.

In the method for reducing the nitrogen oxide according to the present embodiment, the temperature and flow rate of the water to be allowed to flow are controlled. Thereby, the humidity of the air moisturized through the steam permeable membrane can be controlled with high accuracy.

In the conventional method for spraying water to moisturize the air, the water droplets in the moisturized air are difficult to remove, and arbitrary control of the humidity is also difficult. On the other hand, in the method according to the present embodiment, no water droplets are produced, and the humidity can be easily controlled arbitrarily. For this reason, condensation caused by a slight change in the temperature of the moisturized air can be prevented. Accordingly, the method according to the present embodiment is a method with very high reliability and stability.

In the method for reducing the nitrogen oxide according to the present embodiment, the air is moisturized through the steam permeable membrane. For this reason, as the water or steam to be allowed to flow, those including an electrolyte, particularly sodium chloride can be also used. As a method for moisturizing feed air for an internal combustion engine, the SAM method (Sweep Air Moisturizing) is known. The method is a method mainly used to reduce nitrogen oxides emitted from marine diesel engines, in which the feed air is moisturized by sea water and then subjected to a desalinating step of treating the feed air by fresh water to remove sea water mist contained in the feed air. In the case where the desalinating is not completely performed, salt invades the internal combustion engine, and causes breakdown of the internal combustion engine. Accordingly, the desalinating needs to be fully performed.

On the other hand, in the method for reducing a nitrogen oxide according to the present embodiment, the air is moisturized using the steam permeable membrane. For this reason, water that is a liquid is not permeated, and salt is not transferred to the air to be moisturized. Accordingly, as the water used for moisturization, other than the water highly desalinated, the water desalinated at a lower level and sea water can be used. Even if sea water is used, the desalinating step is unnecessary, and the feed air can be moisturized with a very simple structure of the apparatus.

The steam permeable membrane used in the present embodiment may be any membrane that can moisturize at least the air. Specifically, it is a membrane having at least a property in which liquid water is not permeated while steam is permeated. The structure and material of the steam permeable membrane are not particularly limited, and can be properly selected according to the application or environment in use. The steam permeable membrane may be any membrane having the properties above, and the kind thereof is not limited. Examples thereof may include those using a hydrophobic micropore membrane and a gas permeable membrane.

The hydrophobic micropore membrane is a micropore membrane having hydrophobicity, which does not permeate liquid water but permeates steam. Here, the hydrophobicity means that a water absorbing rate as a polymer is not more than 0.5% by mass. The water absorbing rate is preferably not more than 0.1% by mass, more preferably not more than 0.05% by mass, and still more preferably not more than 0.01% by mass. Here, the water absorbing rate as a polymer can be measured by the method described in Examples described later.

Preferably, in order to repel liquid water, the hydrophobic micropore membrane has such a pore size that the material that forms the micropore membrane (such as a resin) does not permeate liquid water but can permeate steam. Particularly, a hydrophobic micropore membrane having the ratio of an oxygen permeating rate to a nitrogen permeating rate (oxygen permeating rate/nitrogen permeating rate) of 1 or less is more preferable.

Here, the ratio of an oxygen permeating rate to a nitrogen permeating rate is a ratio of an amount of oxygen (or nitrogen) to be permeated per unit time converted to an amount per unit area and unit pressure (for example, GPU=$10^{-6}$ cm$^3$ (STP)/cm$^2$/s/cmHg).

The kind of the hydrophobic micropore membrane is not particularly limited. For example, examples thereof may include fluororesin-based micropore membranes, and a variety of known micropore membranes can be used such as polyvinylidene fluoride (PVDF) micropore membranes, polytetrafluoroethylene (PTFE) micropore membranes, polyimide micropore membranes, polyolefin micropore membranes, polysulfone micropore membranes, and polyethersulfone micropore membranes. Further, examples thereof may include polysulfone micropore membranes and polyethersulfone micropore membranes used as an ultrafiltration membrane (UF membrane).

The gas permeable membrane refers to a membrane in which a gas cannot permeate through any pore substantially, and the gas is permeated by dissolving or dispersing in the membrane. The kind of the gas permeable membrane is not particularly limited, and examples thereof may include organic polymer or inorganic gas permeable membranes. In the present embodiment, a gas permeable membrane having an oxygen permeating rate/nitrogen permeating rate of more than 1 is preferable.

As the organic polymer gas permeable membrane, particularly preferable are hydrophobic organic polymer gas permeable membranes. The hydrophobicity used herein is as described above. Examples of the organic polymer gas permeable membrane may include fluororesin-based gas permeable membranes, polyimide-based gas permeable membranes, and silicon-based gas permeable membranes. Among these, from the viewpoint of a higher permeating rate of the steam, preferable are fluororesin-based permeable membranes and polyimide-based gas permeable membranes, and more preferable are fluororesin-based gas permeable membranes.

As the fluororesin-based gas permeable membrane, preferable are those using an amorphous fluorine-containing polymer. Examples of such an amorphous fluorine-containing polymer may include polymers having a fluorine-containing alicyclic structure in the main chain. The polymers having a fluorine-containing alicyclic structure in the main chain are obtained, for example, by copolymerization of a monomer having a dioxole ring such as perfluoro(2,2-dimethyl-1,3-dioxole) (PDD), perfluoro(2-methyl-1,3-dioxole), perfluoro (2-ethyl-2-propyl-1,3-dioxole), perfluoro (2,2-dimethyl-4-methyl-1,3-dioxole) with a monomer having a fluorine-containing alicyclic structure such as perfluorodioxoles having fluorine or a fluorine-substituted alkyl group such as a trifluoromethyl group, a pentafluoroethyl group, and a heptafluoropropyl group, perfluoro(4-methyl-2-methylene-1,3-dioxolane) (MMD), and perfluoro(2-methyl-1,4-dioxin).

Moreover, polymers having a fluorine-containing alicyclic structure in the main chain obtained by copolymerization of the monomer with some other radical polymerizable monomer without C—H bonds can be also used. From the viewpoint of improving the gas permeability of the fluorine-containing polymer, the proportion of the polymerization unit of the monomer having a fluorine-containing alicyclic structure in the fluorine-containing polymer is preferably 70 mol % or more. Thereby, the cyclic structure is increased, and the distance between molecules is increased. Accordingly, the gas permeating rate can be further increased.

Examples of the other radical polymerizable monomer without C—H bonds may include tetrafluoroethylene, chlorotrifluoroethylene, and perfluoro(methylvinylether). Examples of amorphous fluorine-containing polymers substantially having no C—H bonds may include perfluoro-2,2-dimethyl-1,3-dioxol polymers. These are commercially available, and the commercially available products may be employed in the present invention. Examples thereof may include a trade name "Teflon (registered trademark) AF1600" (made by E. I. du Pont de Nemours and Company), a trade name "Teflon (registered trademark) AF2400" (made by E. I. du Pont de Nemours and Company), and a trade name "HYFLON AD" (made by Solvay Solexis S.p.A.). A contact angle of water with the surface of the steam permeable membrane and the moisturizing nitrogen-enriching membrane described later is preferably 90° or more, more preferably 95° or more, and still more preferably 100° or more. The contact angle of water can be measured by a method described in Examples described later.

Examples of the inorganic gas permeable membrane may include silicon nitride-based gas permeable membranes and carbon-based gas permeable membranes.

The above steam permeable membrane and the nitrogen-enriching membrane and moisturizing nitrogen-enriching membrane (hereinafter, generally referred to as a "membrane" in some cases.) described later may have a support layer. Thereby, the mechanical strength of the membrane can be improved. The material of the support layer is not particularly limited as long as the membrane can demonstrate the functions such as moisturization and nitrogen enrichment, and a variety of materials can be used. For example, woven fabrics, non-woven fabrics, and micropore membranes can be used. Examples of the micropore membranes used as the support layer may include polyimide micropore membranes, PVDF micropore membranes, PTFE micropore membranes, polyolefin micropore membranes, and polysulfone micropore membranes and polyethersulfone micropore membranes used as an ultrafiltration membrane (UF membrane). In the case of the flat sheet membrane, examples of the forms may include forms in which a membrane is formed on the support layer. In the case of the hollow fiber membrane, examples of the forms may include forms in which a membrane is formed on an inner or outer surface of the hollow fiber membrane that is the support layer.

In the case of a polyimide-based membrane, other examples of the membrane having the support layer may include a membrane having an asymmetric structure in which the membrane itself is formed by a wet method. In the case of the inorganic gas permeable membrane, examples thereof may include those in which a gas permeable membrane is formed by hydrothermal synthesis on the support layer formed with a ceramic membrane, and those formed as a thin film by chemical vapor deposition (CVD).

In the present embodiment, water (including steam) is allowed to flow along the steam permeable membrane to moisturize the air. For this reason, according to the performance of each of the steam permeable membranes above, the flow rate and temperature of the water can be controlled to easily adjust humidity of the air.

In the case of moisturizing the air using the steam permeable membrane, the water used for moisturization is not particularly limited, and it may be pure water, clean water, gray water, or water including ions or fine particles as impurities. The water used in the present embodiment can provide a high moisturizing effect even if it may includes an electrolyte. For example, even water including sodium chloride (such as sea water) can provide a high moisturizing effect. Particularly, in the steam permeable membrane using an organic polymer having no ionic functional group, leakage of these impurities to the air feeding side can be effectively suppressed, and moisturization can be performed in a cleaner manner.

The state of the water used in the present embodiment is not particularly limited, and it may be a liquid or a gas (steam). Use of steam can moisturize the air without degrading the nitrogen-enriching ability of the nitrogen-enriching membrane and moisturizing nitrogen-enriching membrane.

In the case where the water is steam, another substance may be used as a carrier when necessary. Particularly, the air is preferably used as the carrier. Use of the carrier can control the flow rate and temperature of the steam more precisely. Among these, more preferable is use of the discharge air from the internal combustion engine as the carrier. Use of the discharge air from the internal combustion engine as the carrier can reuse the discharge air from the internal combustion engine, and further reduce an influence on the environment.

When the air is moisturized through the steam permeable membrane, the direction of the air flowing and the direction of the water flowing are not particularly limited. Preferably, the direction of the pressurized air flowing is opposed to the direction of the water or steam flowing with the two separated by the membrane. The pressurized air flows in the direction opposite to the direction of the water or steam flowing. Thereby, efficient moisturization can be performed. Even if the water including salt and impurities such as sea water is used, the flow of the water over the surface of the steam membrane can prevent the salt and impurities from stagnating on the surface of the steam permeable membrane, leading to stable operation for a long period of time.

The relationship between the pressure of the air (air pressure) and the pressure of the water (water pressure) is not particularly limited. Preferably, the water is pressurized at a pressure equal to or higher than that applied to the pressurized air. Namely, preferably, the water is allowed to flow while the pressure of the water is kept at a pressure as high as the pressure of the air to be moisturized or higher than that. Thereby, the pressurized air can be easily moisturized. Moreover, if the pressure of the water at a pressure as high as the pressure of the air to be moisturized or higher than that, the air to be moisturized can be prevented from permeating through the steam permeable membrane, and loss of the amount of the air and energy can be suppressed.

By allowing the water to flow, a constant amount of heat can always be fed to the pressurized air, and the humidity and temperature of the air can be easily controlled. The temperature of the water to be allowed to flow is preferably set at from −10° C. to +30° C. based on the temperature of the pressurized air to be fed. By having the temperature in the range, the air can be moisturized more effectively, and it is more effective on NOx reduction.

In the method for reducing the nitrogen oxide according to the present embodiment, the moisturized air having a humidity 50% RH or more can be obtained. The humidity of the moisturized air is more preferably 80% RH or more, and still more preferably 90% RH or more. In the case where the air having such a humidity is used for operation of the internal combustion engine, the content of NOx in the exhaust gas from the internal combustion engine can significantly reduced. Preferably, the moisturized air has such a humidity that condensation may not occur. The humidity is preferably less than 100% RH, and more preferably 95% RH or less. Thereby, condensation caused by a slight change in the temperature of the moisturized air can be prevented.

In the method for reducing the nitrogen oxide according to the present embodiment, the content of the water in the moisturized air is preferably 1 mol % or more. Preferably, a larger amount of water molecules in the moisturized air can suppress a larger amount of NOx to be produced in the internal combustion engine. The content is more preferably 3 mol % or more, still more preferably 6 mol % or more, still more preferably 9 mol % or more, and further still more preferably 10 mol % or more.

The upper limit of the content of the water is preferably such content that the humidity may not exceed the upper limit described above. If the content of the water is increased at a certain temperature, the vapor pressure of the water is increased, and the humidity (% RH) that is a proportion of the vapor pressure to the saturated vapor pressure is also increased. Accordingly, the content of the water is preferably adjusted so that the humidity may be less than 100% RH at an operating temperature of the internal combustion engine. For this reason, although the upper limit of the content of the water depends on the temperature of the moisturized air, the content of the water allowing for a humidity of less than 100% RH is preferable.

In the present embodiment, the water is preferably circulated and used. The manner of the circulation is not particularly limited. Preferably, for example, the water that has flowed over the surface of the steam permeable membrane is allowed to flow again along the surface of the steam permeable membrane to circulate the water. Thereby, an amount of the water to be used can be reduced, and circulation of the water is preferable from the viewpoint of economy.

In the method for reducing the nitrogen oxide according to the present embodiment, the pressurized air is preferably not only moisturized but also nitrogen-enriched. In this case, examples of such a method may include a method for moisturizing nitrogen-enriched air, a method for nitrogen-enriching moisturized air, and a method for performing moisturization and nitrogen enrichment at the same time.

Use of the moisturized and nitrogen-enriched air as the feed air for the internal combustion engine can reduce NOx to be produced more effectively. Although the mechanism is not clear, it is presumed that NOx to be produced can be reduced more effectively because of (1) to (3) below (however, the mechanism of the present embodiment will not be limited to these).

(1) The air used for combustion contains steam. Thereby, the concentration of oxygen in the air can be reduced to suppress a combustion reaction, leading to reduction in a combustion temperature. For this reason, a side reaction to produce NOx can be suppressed.

(2) Water, which is a triatomic molecule, has a relatively high specific heat, can reduce a heat generating temperature during combustion. For this reason, a side reaction to produce NOx can be suppressed.

(3) The combustion reaction is suppressed in an environment with a low concentration of oxygen. Thereby, the combustion temperature can be reduced, suppressing the side reaction to produce NOx more effectively.

Examples of the method for moisturizing nitrogen-enriched air or the method for nitrogen-enriching moisturized air may include a method comprising the step of moisturizing the air and further the step of nitrogen-enriching the air. In the case where nitrogen enrichment and moisturization are performed separately, it is advantageous in that the humidity of the air and the concentration of oxygen in the air are easily controlled. The step of nitrogen-enriching the air may be performed before or after the step of moisturizing the air. Preferable is a method for nitrogen-enriching the pressurized air and subsequently moisturizing the nitrogen-enriched pressurized air. In the case where the nitrogen-enriching membrane is used, the method preferably comprises the step of discharging oxygen permeated through the membrane to the outside of the system. Specifically, examples thereof may include a method for bringing the pressurized air into contact with the nitrogen-enriching membrane, and allowing sweeping air to flow along the other surface of the nitrogen-enriching membrane.

The nitrogen-enriching membrane used for nitrogen enrichment is a selectively permeable membrane having at least properties in which oxygen is permeated with a priority from a mixed gas such as air. The structure and material of the nitrogen-enriching membrane are not particularly limited, and can be properly selected according to the application and environment in use. In the steam permeable membrane above, examples of preferable membranes may include the gas permeable membranes. Preferable are the organic polymer gas permeable membranes at the ratio of oxygen permeating rate/nitrogen permeating rate of 1 or more.

In the case where moisturization (for example, the steam permeable membrane is used.) and nitrogen enrichment (for example, the nitrogen-enriching membrane is used.) are performed separately, in the pressure of the surface of the nitrogen-enriching membrane for nitrogen-enrichment, the pressure of the sweeping air is preferably the same as or lower than the pressure of the pressurized air. Thereby, oxygen easily permeates through the nitrogen-enriching membrane.

Examples of the method for performing moisturization and nitrogen enrichment at the same time may include a method using a moisturizing nitrogen-enriching membrane as a steam permeable membrane. Specifically, examples thereof may include a method for bringing the pressurized air into contact with one surface of the moisturizing nitrogen-enriching membrane to nitrogen-enrich the pressurized air and at the same time allowing water to flow along the other surface of the moisturizing nitrogen-enriching membrane to moisturize the pressurized air.

In the case of performing moisturization and nitrogen enrichment at the same time, it is advantageous in that the number of work steps is small, and moisturization and nitrogen enrichment can be performed with a simple apparatus structure. In the case where the moisturizing nitrogen-enriching membrane is used, the method preferably further comprises the step of discharging oxygen permeated through the membrane to the outside of the system, or the step of removing oxygen from the water allowed to flow.

Here, the moisturizing nitrogen-enriching membrane refers to a membrane that can moisturize the air and selectively permeate oxygen. Use of the membrane enables performing moisturization and nitrogen enrichment at the same time. Examples of the moisturizing nitrogen-enriching membrane may include the gas permeable membranes among the steam permeable membranes above. Preferable are the organic polymer gas permeable membranes having the ratio of oxygen permeating rate/nitrogen permeating rate of more than 1. More preferable specific examples of the moisturizing nitrogen-enriching membranes may include fluororesin-based gas permeable membranes among the steam permeable membranes.

In the case where moisturization and nitrogen enrichment are performed at the same time, the pressure of the moisturizing nitrogen-enriching membrane is not particularly limited. Preferably, the pressure of the water is the same as or lower than the pressure of the pressurized air. Thereby, oxygen easily permeates. The method for controlling the pressure of the water flowing along the moisturizing nitrogen-enriching membrane with the two separated by the moisturizing nitrogen-enriching membrane to be the same as or lower than the pressure of the pressurized air that contacts the moisturizing nitrogen-enriching membrane is not particularly limited. Examples thereof may include a method for reducing the pressure of a region in which the water flows, thereby to allow the water to flow.

In the case where moisturization and nitrogen enrichment are performed at the same time, the direction of the pressurized air flowing is preferably opposed to the direction of the water flowing. The pressurized air flows in the direction opposite to the direction of the water flowing. Thereby, in the surface of the moisturizing nitrogen-enriching membrane, a partial pressure difference of oxygen between the water flowing side and the air flowing side is produced over the membrane. As a result, oxygen is permeated more efficiently.

The concentration of oxygen in the moisturized and nitrogen-enriched air is not particularly limited, and preferably 20 mol % or less. The concentration is more preferably 19 mol % or less, still more preferably 18.5 mol % or less, still more preferably 18 mol % or less, and further still more preferably 17.5 mol % or less. The preferable range of the humidity is as described in the moisturizing method.

Besides, the temperature and flow rate of the water or steam and the circulation of the water or steam are the same as those described in the method for reducing the nitrogen oxide by moisturization. Particularly, even if moisturization and nitrogen enrichment are performed, the water or steam can be allowed to flow to easily control the temperature and humidity of the pressurized air.

Hereinafter, the membrane module, apparatus for reducing the nitrogen oxide from an internal combustion engine, and internal combustion engine apparatus according to the present embodiment will be described.

The membrane module according to the present embodiment is a membrane module including a steam permeable membrane and a housing that accommodates the steam permeable membrane, in which the inside of the housing is partitioned by the steam permeable membrane to form a first space and a second space; and the housing may include an air feeding port that feeds air to the first space, an air discharging port that discharges the air, a water feeding port that feeds water to the second space, and a water discharging port that discharges the water.

The membrane module according to the present embodiment is obtained by incorporating a steam permeable membrane into a module. The first space of the membrane module may include an air feeding port that is an opening for feeding the air, and an air discharging port that is an opening for taking out the air moisturized by the steam permeable membrane. The first space is a space through which the air flows. The second space of the membrane module may include a water feeding port and a water discharging port that are openings for allowing the water or steam to flow. The second space is a space through which the water flows. The number of each of the openings is not particularly limited, and the suitable number of the openings can be provided in consideration of the form of the membrane module in use.

The form of the membrane module is not particularly limited, and examples thereof may include hollow fiber type membrane modules and flat sheet membrane type membrane modules. Examples thereof may include membrane modules of a plate and frame type and pleated type using a flat sheet membrane and membrane modules of a hollow fiber type and a tubular type. Examples of the pleated type membrane modules may include those having a shape in which pleats are layered to form a box shape, and those having a shape in which pleats are wound around a cylinder.

FIG. 1 shows a perspective view of one embodiment of the membrane module according to the present embodiment. A membrane module α is a membrane module having a shape in which pleats are layered to form a box shape. A steam permeable membrane α1 has a plurality of pleated portions (pleats) formed by repeatedly folding a membrane like an accordion so that the upper folded portion is layered on the lower folded portion. The pleating provides a structure in which the upper folded portion (mountain folded portion) and the lower folded portion (valley folded portion) are repeated at a specific interval. This can improve the contact area, leading to high efficiency. Here, as an example, the case where the steam permeable membrane α1 is used has been described. As the steam permeable membrane, the moisturizing nitrogen-enriching membrane described later or the like may be used.

Figure 2:
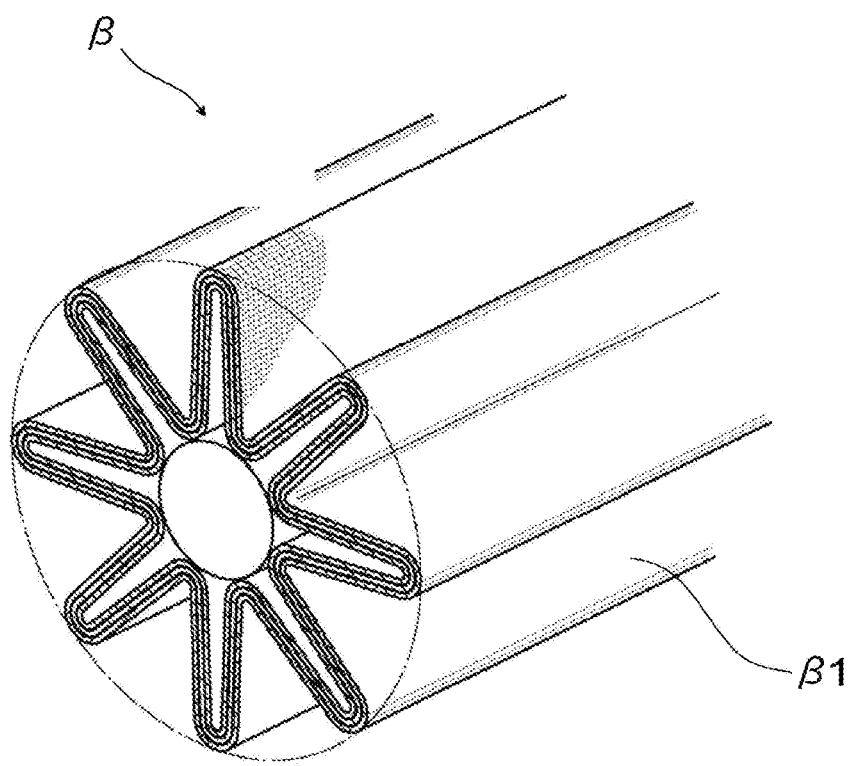
FIG. 2 shows a perspective view of another embodiment of the membrane module according to the present embodiment.

FIG. 2 shows a perspective view of another embodiment of the membrane module according to the present embodiment. A membrane module β is a membrane module having a shape in which pleats are wound around a cylinder. Here, as an example, the case where a steam permeable membrane β1 is used has been described. As the steam permeable membrane, the moisturizing nitrogen-enriching membrane described later or the like may be used.

Figure 3:
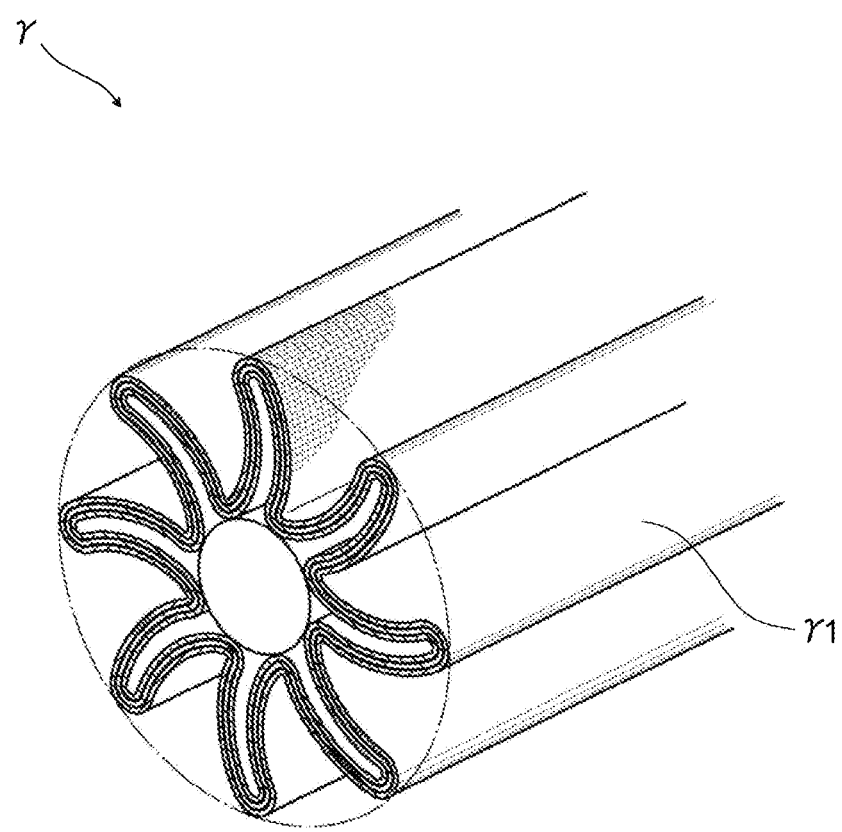
FIG. 3 shows a perspective view of another embodiment of the membrane module according the present embodiment.

FIG. 3 shows a perspective view of another embodiment of the membrane module according to the present embodiment. The membrane module γ is a membrane module having a shape (spiral shape) in which pleats are wound around a cylinder, and the pleats are inclined (twisted) counterclockwise to the central axis of the cylinder. Here, as an example, the case where a steam permeable membrane γ1 is used has been described. As the steam permeable membrane, the moisturizing nitrogen-enriching membrane described later or the like may be used.

Among the membrane modules, preferable are the hollow fiber type membrane modules from the viewpoint of a large membrane area per unit volume (specific surface area), and the pleated type membrane modules having small pressure loss. The hollow fiber type membrane module may be an external pressure type in which filtration is performed from the outer surface side of the hollow fiber, or an internal pressure type in which filtration is performed from the inner surface side of the hollow fiber. More preferable is the internal pressure type in which the fed air is fed to the inner surface of the hollow fiber.

Figure 4:
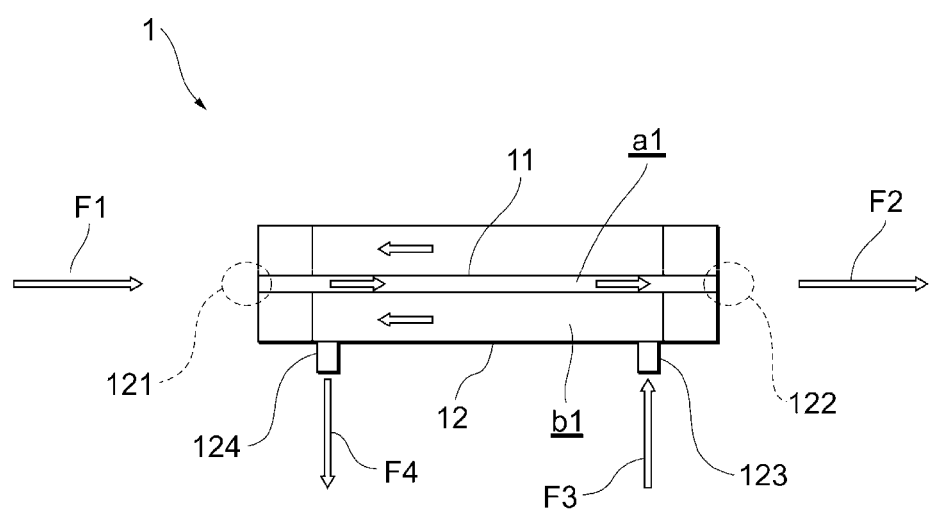
FIG. 4 shows a conceptual view of one embodiment of a hollow fiber type membrane module used in the present embodiment.

FIG. 4 shows a conceptual view of one embodiment of a hollow fiber type membrane module used in the method for reducing the nitrogen oxide from an internal combustion engine according to the present embodiment. A membrane module 1 may include a steam permeable membrane 11, and a housing 12 that accommodates the steam permeable membrane 11. The membrane module 1 is a tubular hollow fiber type membrane module having the steam permeable membrane 11 of a hollow fiber membrane incorporated into the inside thereof. The housing 12 may include an air feeding port 121, an air discharging port 122, a water feeding port 123, and a water discharging port 124. Within the housing 12, the housing 12 is partitioned by the steam permeable membrane 11 to form a first space a1 and a second space b1. In the case of the hollow fiber type membrane module, the first space a1 is formed on the inner diameter side of the membrane (steam permeable membrane 11), and the second space b1 is formed on the outer diameter side thereof. The first space a1 is an air region through which the air to be treated flows, and the second space b1 is a water region through which the water flows.

The air is fed from the air feeding port 121 to the steam permeable membrane 11 (see an arrow F1), and the moisturized air is discharged from the air discharging port 122 (see an arrow F2). At this time, the water for moisturizing the air is fed from the water feeding port 123 into the housing 12 (see an arrow F3), and discharged from the water discharging port 124 to the outside of the housing (see an arrow F4). In FIG. 4, the flow of the air is opposed to that of the water. The membrane module 1 may include one air feeding port 121, one air discharging port 122, one water feeding port 123, and one water discharging port 124. In the present embodiment, the number of the respective ports may be 2 or more when necessary. For example, from the viewpoint of the velocity of the air flowing and efficiency of moisturizing (and nitrogen-enriching) the air, the number of the air feeding port 121, the number of the air discharging port 122, the number of the water feeding port 123, and the number of the water discharging port 124 can be 2 or more.

Figure 5:
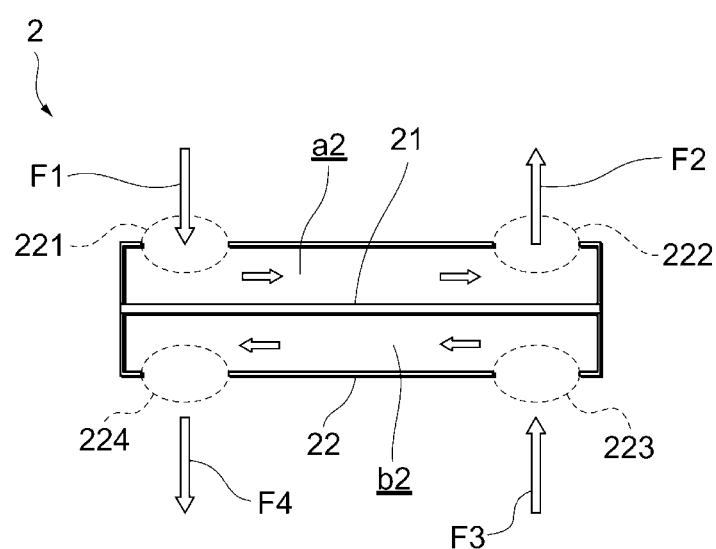
FIG. 5 shows a conceptual view of one embodiment of a flat sheet membrane type module used in the present embodiment.

FIG. 5 shows a conceptual view of one embodiment of a flat sheet membrane type module used in the method for reducing a nitrogen oxide from an internal combustion engine according to the present embodiment. Here, the explanation of similarities described in FIG. 4 will be omitted, and differences from the embodiment in FIG. 4 will be mainly described. A membrane module 2 may include a steam permeable membrane 21, and a housing 22 that accommodates the steam permeable membrane 21. The membrane module 2 is a box-shaped membrane module having the steam permeable membrane 21 of a flat sheet membrane incorporated into the inside thereof. The housing 22 may include an air feeding port 221, an air discharging port 222, a water feeding port 223, and a water discharging port 224. Within the housing 22, the housing 22 is partitioned by the steam permeable membrane 21 to form a first space a2 and a second space b2. In the case of the box-shaped membrane module, the first space a2 is formed on one surface side (the upper side in FIG. 5) of the flat sheet membrane (steam permeable membrane 21), and the second space b2 is formed on the other surface side (the lower side in FIG. 5) of the flat sheet membrane. The first space a2 is an air region through which the air to be treated flows, and the second space b2 is a water region through which the water flows.

The air is fed from the air feeding port 221 to the steam permeable membrane 21 (see an arrow F1), and the moisturized air is discharged from the air discharging port 222 (see an arrow F2). At this time, the water for moisturizing the air is fed from the water feeding port 223 into the housing 22 (see an arrow F3), and discharged from the water discharging port 224 to the outside of the housing (see an arrow F4). In FIG. 5, the flow of the air is opposed to that of the water.

In FIG. 4 and FIG. 5, as an example, the membrane module having a steam permeable membrane as the membrane has been described. The kind of membranes can be selected according to the form in use. For example, instead of the steam permeable membrane, the nitrogen-enriching membrane above can be used, or the moisturizing nitrogen-enriching membrane above can be used.

The apparatus for reducing the nitrogen oxide from an internal combustion engine according to the present embodiment is an apparatus for reducing the nitrogen oxide from an internal combustion engine including the membrane module above, an air feeding portion that feeds the pressurized air to the air feeding port of the membrane module, and a water feeding portion that feeds water to the water feeding port of the membrane module, wherein the treated air discharged from the air discharging port of the membrane module is fed to the combustion chamber of the internal combustion engine. In the present embodiment, the air treated (moisturized and/or nitrogen-enriched) by the membrane module above is fed to the combustion chamber of the internal combustion engine. Thereby, the content of NOx in the exhaust gas discharged from the internal combustion engine can be significantly reduced.

The kind of internal combustion engines is not particularly limited, and examples thereof may include diesel engines. The application of the diesel engines is not particularly limited, and examples thereof may include power sources for ships, automobiles, generators, air planes, a variety of heavy equipment, and turbines. Of the internal combustion engines, the diesel engines have high thermal efficiency. The diesel engines can use ordinary fuels such as light oil and heavy oil as well as a variety of liquid fuels, and have high general versatility. Reduction in the content of NOx in the exhaust gas from such a diesel engine has great significance in the environmental respects. In the present embodiment, as described above, even the water including salt such as sodium chloride and other impurities can be used for moisturization. From the viewpoint of this, the present embodiment can be used for marine diesel engines and the like that can easily obtain sea water or the like, for example. Examples of the kind of diesel engines suitable for the present embodiment may include 2-stroke engines, 4-stroke diesels, high speed engines, middle speed engines, and low speed engines.

In the present embodiment, the air is fed to the air feeding port of the membrane module by the air feeding portion. The air feeding portion is not particularly limited as long as the air can be fed to the air feeding port of the membrane module. For example, an air pressurizing apparatus can be used. By the air pressurizing apparatus, the pressurized air can be fed to the membrane module. The air pressurizing apparatus is not particularly limited, and a known apparatus can be used. Natural suction air, feed air by a supercharger, and feed air by a blower can be used. More specifically, examples of the air pressurizing apparatus may include compressors and turbine pumps. Particularly, preferable is use of superchargers for the internal combustion engine. The supercharger refers to an apparatus that compresses the air and forces the compressed air into the internal combustion engine, and the kind thereof is not particularly limited. Examples thereof may include turbochargers, superchargers, Lysholm compressors, and pressure wave superchargers.

In the present embodiment, the water is fed to the water feeding port of the membrane module by the water feeding portion. The water feeding portion is not particularly limited as long as the water can be fed to the water feeding port of the membrane module, and a known method can be used. Examples of the method may include a method for feeding the water from a water tank to the water feeding port of the membrane module. Alternatively, the water can be fed to the water feeding port by pressurizing the water. Examples of a method for pressurizing water and introducing the water into the water feeding port may include a method for providing a pressurizing pump at upstream of the water feeding port or at downstream of the water discharging port, and introducing the water or steam. Preferably, the pressure of the second space (air region) of the membrane module is reduced to introduce the water from the water feeding port into the second space. Specific examples thereof may include a method for providing a self-priming pump and an ejector at downstream of the water discharging port and introducing the water into the second space.

Preferably, the water feeding portion may include a liquid transfer portion that feeds the water discharged from the water discharging port of the membrane module again to the water feeding port of the membrane module. Thereby, the water fed to the membrane module can be circulated, and the amount of the water to be used can be preferably reduced. For example, in the membrane module, at least two openings in the second space are connected to a water tank, and the water or steam can be circulated via one of the openings connected to a water feeder. In the case of two openings, examples of a configuration may include a configuration in which one opening is connected to a water tank through a water feeding pump, and the other opening is directly connected to the water tank. In the case of a plurality of openings, examples of a configuration may include a configuration in which several openings thereof are connected to a water tank through a water feeding pump, and the other several openings are directly connected to the water tank. The configuration can ensure a path in which the water or steam is fed from the water tank through a water feeder to the membrane module, discharged from the water discharging port, and returned to the water tank. Thereby, the water or steam can be circulated. In the case of the steam, the discharge air may be used as a carrier, and the exhaust gas discharged from the internal combustion engine may be joined to the path through which the steam flows.

The present embodiment preferably further includes a temperature control unit that controls the temperature of the water, a flow rate control unit that controls the flow rate of the water, or both thereof. By the water temperature control unit or the water flow rate control unit connected to the water tank or the water feeder, the temperature and flow rate of the water can be controlled in a suitable condition. The configuration of the apparatus or the like is not particularly limited. Examples of the configuration may include a configuration including a water temperature control unit that heats or cools the water on the basis of the water temperature measured by a water temperature monitor, and a flow rate control unit that adjusts the flow rate of the water on the basis of the flow rate measured by a flow rate monitor. Preferably, using the water temperature monitor and the flow rate monitor, the water is monitored in real time. Thereby, the temperature and flow rate of the water to be allowed to flow can be automatically controlled. Additionally, at the time of heating the water, use of waste heat of the internal combustion engine is preferable. The waste heat can be obtained from the exhaust gas discharged from the internal combustion engine or an engine oil.

Preferably, the apparatus for reducing the nitrogen oxide according to the present embodiment includes a heat exchanger. Heat exchange is performed between the air sent from the air pressurizing apparatus and the water discharged from the membrane module. Thereby, preferably, the temperature can be adjusted, and the waste heat can be effectively used.

In the apparatus according to the present embodiment, a pre-filter for removing dust from the pressurized air as a pre-treatment may be provided at upstream of the membrane module.

Hereinafter, using the drawings, the apparatus for reducing the nitrogen oxide from an internal combustion engine and internal combustion engine apparatus according to the present embodiment will be described.

Figure 6:
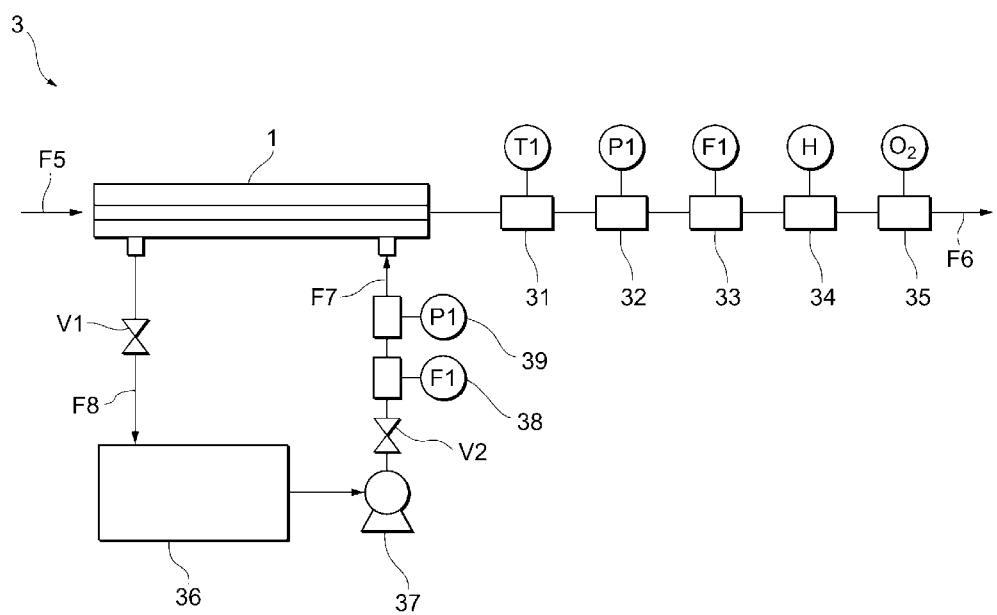
FIG. 6 shows a conceptual view of one embodiment of an apparatus for reducing a nitrogen oxide from an internal combustion engine according to the present embodiment.

FIG. 6 shows a conceptual view of one embodiment of an apparatus for reducing a nitrogen oxide from an internal combustion engine according to the present embodiment. An apparatus for reducing a nitrogen oxide 3 includes the hollow fiber type membrane module 1 above. The pressurized air is fed to the air feeding port of the membrane module 1 (see FIG. 4) from the direction of an arrow F5. To the air discharging port of the membrane module 1 (see FIG. 4), a thermometer 31, a pressure gauge 32, a flow meter 33, a hygrometer 34, and an oxygen concentration meter 46 are connected. Further, a warm water bath 36, a circulating water pump 37, a circulating water flow meter 38, and a circulating water pressure gauge 39 are connected between the water feeding port (see FIG. 4) and the water discharging port (see FIG. 4) in the membrane module 1.

The warm water bath 36 including a thermometer and a heater as a temperature control unit that controls the temperature of the water is preferably used. The warm water bath 36 including such a temperature control unit can control the temperature of the water (circulating water). Further, the apparatus may include the circulating water pump 37, the circulating water flow meter 38, and the circulating water pressure gauge 39 as a flow rate control unit that controls the flow rate of the water. Thereby, the amount of water to be allowed to flow into the membrane module 1 can be controlled. As a result, the effect of reducing NOx can be further improved.

From the viewpoint of controlling the optimal concentration of oxygen and humidity of the feed air according to load of the internal combustion engine to be operated, the pressure and flow rate of the circulating water are preferably controlled by valves V1 and V2. Alternatively, the circulating water pump 37 can be controlled by an inverter.

The pressurized air can be fed to the membrane module 1 from the direction of the arrow F5, and taken out from the direction of an arrow F6 as the moisturized air. The warm water stored in the warm water bath 36 is fed by the circulating water pump 37 to the membrane module 1 from the direction of an arrow F7, and circulated toward the direction of an arrow F8. The flow of the air flowing over the surface of the membrane module 1 (see the arrows F5 and F6) is opposed to the flow of the water flowing over the surface of the membrane module 1 (see the arrows F7 and F8).

Figure 7:
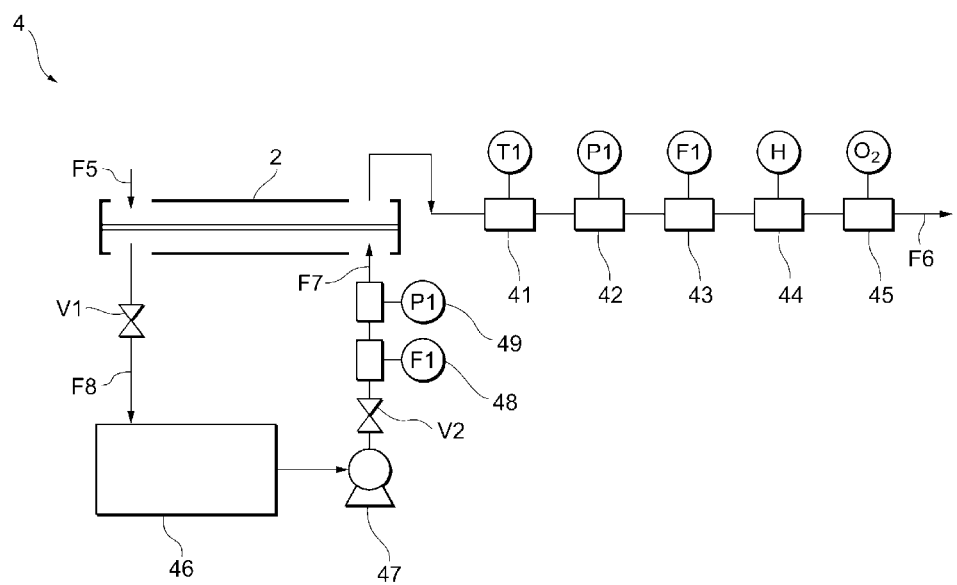
FIG. 7 shows a conceptual view of another embodiment of the apparatus for reducing the nitrogen oxide from an internal combustion engine according to the present embodiment.

FIG. 7 shows a conceptual view of another embodiment of the apparatus for reducing the nitrogen oxide from an internal combustion engine according to the present embodiment. An apparatus for reducing a nitrogen oxide 4 includes the flat sheet membrane type membrane module 2 above (see FIG. 5). The pressurized air is fed to the air feeding port of the membrane module 2 (see FIG. 5) from the direction of the arrow F5. To the air discharging port of the membrane module 2 (see FIG. 5), a thermometer 41, a pressure gauge 42, a flow meter 43, a hygrometer 44, and an oxygen concentration meter 45 are connected. Further, a warm water bath 46, a circulating water pump 47, a circulating water flow meter 48, and a circulating water pressure gauge 49 are connected between the water feeding port (see FIG. 5) and the water discharging port (see FIG. 5) in the membrane module 2.

The pressurized air can be fed to the membrane module 2 from the direction of the arrow F5, and taken out from the direction of the arrow F6 as the moisturized air. The warm water stored in the warm water bath 46 is fed by the circulating water pump 47 to the membrane module 2 from the direction of the arrow F7, and circulated toward the direction of the arrow F8. The flow of the air flowing over the surface of the membrane module 2 (see the arrows F5 and F6) is opposed to the flow of the water flowing over the surface of the membrane module 2 (see the arrows F7 and F8).

Because the optimal concentration of oxygen and humidity of the suction air are controlled according to load of the internal combustion engine, the pressure and flow rate of the circulating water can be controlled by valves V1 and V2. Alternatively, the circulating water pump 47 can be controlled by an inverter. The temperature of the circulating water can be controlled by the warm water bath 46.

Next, an apparatus for reducing a nitrogen oxide from an internal combustion engine that can provide moisturized and nitrogen-enriched air will be described. As described above, in order to obtain the moisturized and nitrogen-enriched air, examples of cases may include the case of performing moisturization and nitrogen enrichment as separate steps and the case of performing moisturization and nitrogen enrichment as one step. In the case of performing moisturization and nitrogen enrichment as separate steps, examples of apparatuses may include an apparatus in which a membrane module that mainly performs moisturization is connected to a membrane module that mainly performs nitrogen enrichment.

Figure 8:
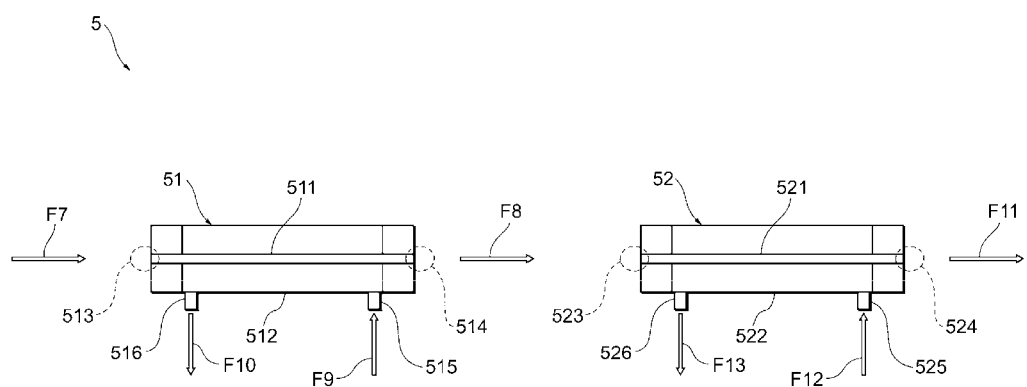
FIG. 8 shows a conceptual view showing part of another embodiment of the apparatus for reducing the nitrogen oxide from an internal combustion engine according to the present embodiment.

FIG. 8 shows a conceptual view showing part of another embodiment of the apparatus for reducing the nitrogen oxide from an internal combustion engine according to the present embodiment. An apparatus for reducing a nitrogen oxide from an internal combustion engine 5 includes a first membrane module 51 that mainly nitrogen-enriches the air, and a second membrane module 52 that mainly moisturizes the air.

The first membrane module 51 includes a nitrogen-enriching membrane 511, and a housing 512 that accommodates the nitrogen-enriching membrane 511. The air to be treated is fed from an air feeding port 513, and sweeping air is fed from a sweeping air feeding port 515. Thereby, the nitrogen-enriched air can be obtained from an air discharging port 514 (see F8). The air fed to the sweeping air feeding port 515 (see an arrow F9) passes through the permeating region (not illustrated) of the membrane module 51, and is discharged from a sweeping air discharging port 516 to the outside (see an arrow F10).

Preferably, the direction of the pressurized air flowing is opposed to the direction of the sweeping air flowing. For this reason, in the membrane module 51, the air is preferably allowed to flow so that the direction of the air to be treated flowing from the air feeding port 513 toward the air discharging port 514 within the membrane module (see the arrows F7 and F8) may be opposed to the direction of the sweeping air flowing from the sweeping air feeding port 515 toward the sweeping air discharging port 516 within the membrane module (see the arrows F9 and F10). Thereby, preferably, a partial pressure difference of oxygen between the air flowing side and the sweeping air flowing side is produced over the nitrogen-enriching membrane 511, and the membrane can be uniformly effectively used, leading to increase in the nitrogen-enriching efficiency.

As the membrane module 51 that mainly nitrogen-enriches the air, a membrane module can be used in which in the membrane module above (see FIG. 4 and FIG. 5), the steam permeable membrane (see the steam permeable membrane 11 in FIG. 4 and the steam permeable membrane 21 in FIG. 5) is replaced by the nitrogen-enriching membrane; the water feeding port (see the water feeding port 123 in FIG. 4 and the water feeding port 223 in FIG. 5) is used as the sweeping air feeding port; the water discharging port (see the water discharging port 124 in FIG. 4 and the water discharging port 224 in FIG. 5) is used as the sweeping air discharging port. In this case, the sweeping air feeding port and the sweeping air discharging port may be open to atmosphere, or connected to an air sweeping apparatus. The pressurized air can be fed from the air feeding port 513 by the membrane module 51, and the nitrogen-enriched air by the nitrogen-enriching membrane 511 can be taken out from the air discharging port 514. On the other hand, the air that permeates through the nitrogen-enriching membrane 511 is oxygen-enriched air. The membrane module 51 includes the sweeping air feeding port 515 and the sweeping air discharging port 516. Thereby, the oxygen-enriched air separated within the membrane module 51 can be discharged to the outside of the system. Here, the permeating region is a region within the membrane module in which the air to be treated permeates through the nitrogen-enriching membrane and the oxygen-enriched air exists.

Preferably, the oxygen-enriched air that permeates through the nitrogen-enriching membrane 511 is discharged by the air sweeping apparatus. Sweeping may be performed by sending air or sucking air. The air sweeping apparatus may be any apparatus that can sweep the oxygen-enriched air, and is not particularly limited. A known apparatus can also be used. Examples of the air sweeping apparatus may include pumps and compressors.

The second membrane module 52 includes a steam permeable membrane 521, and a housing 522 that accommodates the steam permeable membrane 521. In the housing 522, the air to be treated is fed from an air feeding port 523, and the water for moisturization is fed from a water feeding port 525 of the membrane module 52. Thereby, the moisturized and nitrogen-enriched air can be obtained from an air discharging port 524 (see F11). The water fed to the water feeding port 525 (see an arrow F12) passes through a water region of the membrane module 52, and is discharged from a water discharging port 526 to the outside (see an arrow F13). For the second membrane module 52, the membrane modules shown in FIG. 4 and FIG. 5 can be used.

Preferably, the direction of the pressurized air flowing is opposed to the direction of the water flowing. In the membrane module 52, preferably, the water is allowed to flow so that the direction of the air flowing from the air feeding port 523 toward the air discharging port 524 within the membrane module (see the arrows F12 and F13) is opposed to the direction of the water flowing from the water feeding port 525 to the water discharging port 526 within the membrane module (see arrows F18 and F19).

A water feeder is not particularly limited, and examples thereof may include a self-priming pump and an ejector. The water feeder can be provided at downstream of the water discharging port or at upstream of the water feeding port. In the former case, the pressure of the water discharging port in the second space is reduced to introduce the water. In the latter case, pressure is applied to the water to introduce the water.

Figure 9:
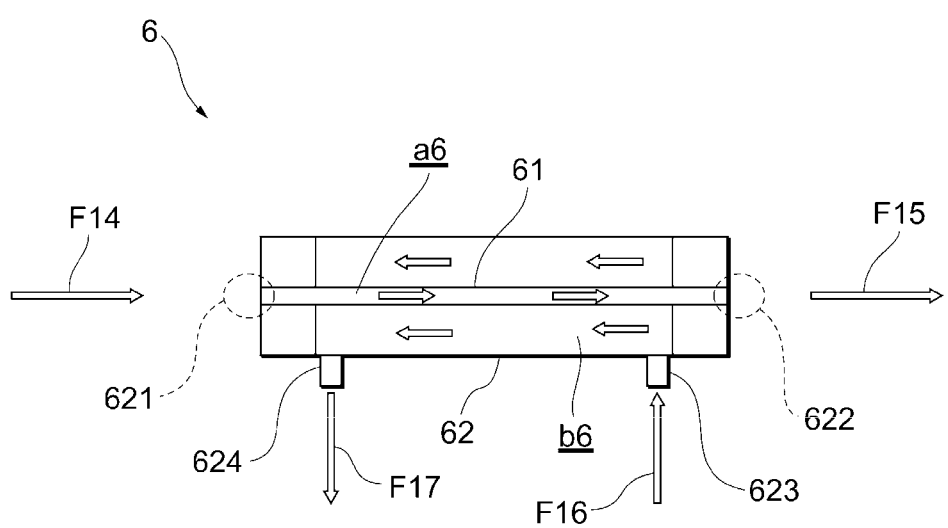
FIG. 9 shows a conceptual view of another embodiment of the hollow fiber type membrane module used in the present embodiment.

FIG. 9 shows a conceptual view of another embodiment of the hollow fiber type membrane module used in the present embodiment. A membrane module 6 includes a moisturizing nitrogen-enriching membrane 61 instead of the steam permeable membrane 11 of the membrane module 1 shown in FIG. 4. The membrane module 6 includes the moisturizing nitrogen-enriching membrane 61, and a housing 62 that accommodates the moisturizing nitrogen-enriching membrane 61. The housing 62 includes an air feeding port 621, an air discharging port 622, a water feeding port 623, and a water discharging port 624.

The air is fed from the air feeding port 621 to the moisturizing nitrogen-enriching membrane 61 (see an arrow F14), and the moisturized air is discharged from the air discharging port 622 (see an arrow F15). At this time, the water for moisturizing the air is fed from the water feeding port 623 into the housing 62 (see an arrow F16), and discharged from the water discharging port 624 to the outside of the housing (see an arrow F17). In FIG. 9, the flow of the air is opposed to that of the water. The membrane module 6 includes one air feeding port 621, one air discharging port 622, one water feeding port 623, and one water discharging port 624. In the present embodiment, the number of the respective ports can be 2 or more when necessary. For example, from the viewpoint of the air, the velocity of the air flowing, and efficiency of moisturizing and nitrogen-enriching the air, the number of the air feeding port 621, the number of the air discharging port 622, the number of the water feeding port 623, and the number of the water discharging port 624 can be 2 or more.

In the membrane module 6, the oxygen-enriched air may be discharged from the water feeding port 623 and the water discharging port 624. Alternatively, other than the water feeding port 623 and the water discharging port 624, an oxygen-enriched air discharging port (not illustrated) may be separately provided, from which the oxygen-enriched air is discharged. Alternatively, a plurality of water feeding ports 623 and a plurality of water discharging ports 624 may be provided to discharge the oxygen-enriched air therefrom. In the case where the discharging port for discharging the oxygen-enriched air is not provided separately, the oxygen-enriched air is preferably discharged from the water discharging port for discharging the water, not from the water feeding port for introducing the water, because it is easier to discharge the oxygen-enriched air.

Similarly to the case of the steam permeable membrane, the form of the moisturizing nitrogen-enriching membrane 61 is not particularly limited, and a suitable form can be properly selected according to the form in use. For example, in the case where the moisturizing nitrogen-enriching membrane 61 is a hollow fiber membrane, the pressurized air is fed from the air feeding port 621 of the membrane module 6 to a first region a6 (air region) that is an inner diameter side of the moisturizing nitrogen-enriching membrane 61, and the water is fed from the water feeding port 623 of the membrane module 6 to a second region b6 (water region) that is an outer diameter side of the moisturizing nitrogen-enriching membrane 61. Thereby, the moisturized nitrogen-enriched air (air having a small amount of oxygen) can be obtained from the air discharging port 622 (see the arrow F15). The water fed to the water feeding port 623 (see the arrow F16) passes through the second region b6 of the membrane module 6, and is discharged from the water discharging port 624 to the outside (see the arrow F17). The oxygen-enriched air that permeates through the moisturizing nitrogen-enriching membrane 61 is discharged to the second region b6, and discharged from the water discharging port 624 to the outside with the water flowing through the water region (see the arrow F17).

In the case where nitrogen enrichment and moisturization are performed at the same time, the apparatus that mainly performs moisturization may be used except that the steam permeable membrane is limited to the moisturizing nitrogen-enriching membrane. In the case where the water is circulated, however, if the permeated oxygen is discharged to the outside, nitrogen enrichment can be performed efficiently. For this reason, a gas-liquid separating chamber for separating the water from the oxygen-enriched air is preferably provided. Examples of the gas-liquid separating chamber may include known gas-liquid separating chamber, and specifically may include a gas-liquid separating chamber in which the oxygen-enriched air is extracted from the upper portion of the chamber, and a gas-liquid separating chamber using a filter.

The apparatus for reducing the nitrogen oxide from an internal combustion engine according to the present embodiment can be connected to the combustion chamber of the internal combustion engine, and used as an internal combustion engine apparatus. The internal combustion engine apparatus according to the present embodiment includes the apparatus for reducing the nitrogen oxide from an internal combustion engine above, and a combustion chamber to which the air treated by the apparatus for reducing the nitrogen oxide is fed.

Figure 10:
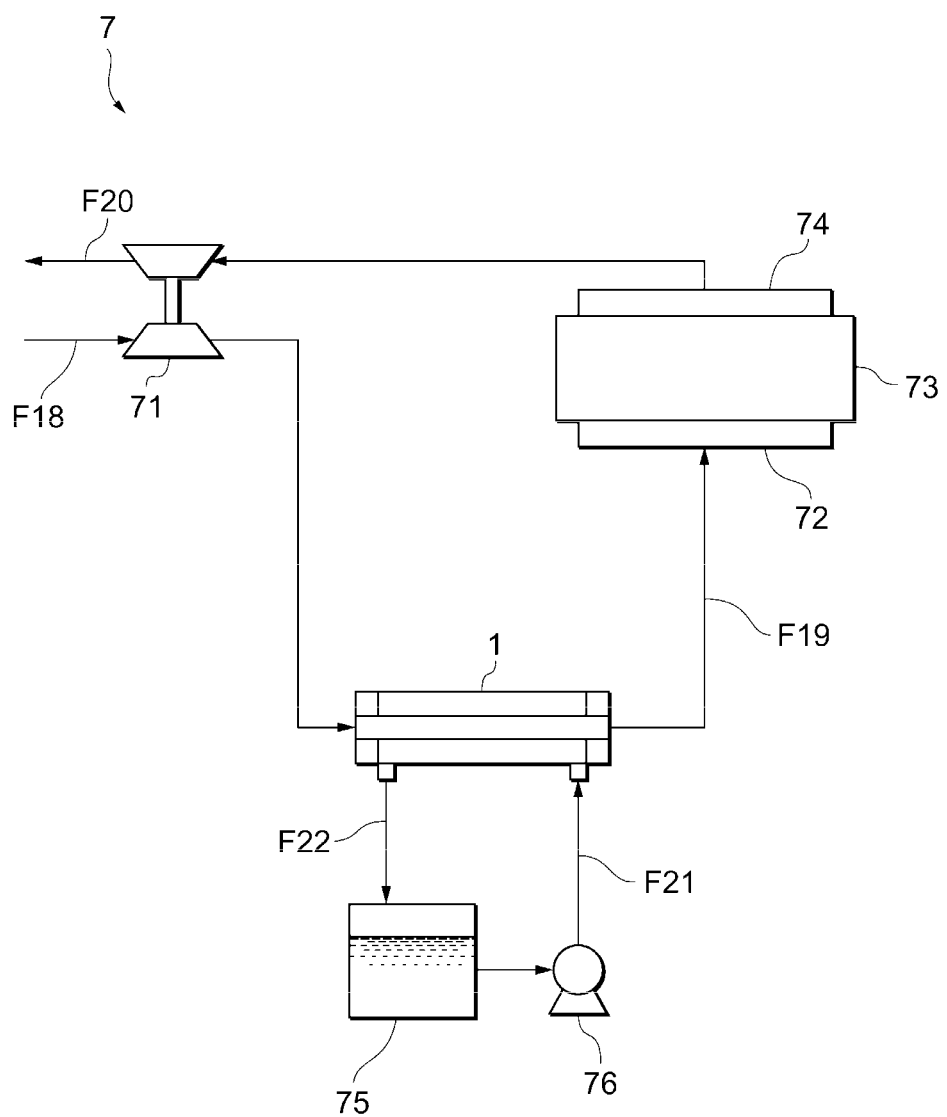
FIG. 10 shows a conceptual view of one embodiment of an internal combustion engine apparatus according to the present embodiment.

FIG. 10 shows a conceptual view of one embodiment of the internal combustion engine apparatus according to the present embodiment. In an internal combustion engine apparatus 7, the apparatus for reducing the nitrogen oxide is provided between a supercharger of the internal combustion engine and a combustion chamber of the internal combustion engine. The internal combustion engine apparatus 7 includes the membrane module 1 above. A turbocharger 71 is connected to the air feeding port of the membrane module 1 (not illustrated). To the air discharging port of the membrane module (not illustrated), a suction manifold 72, a combustion chamber 73 of the internal combustion engine, and a discharge manifold 74 are connected. The air fed to the turbocharger 71 from the direction of the arrow F18 is pressurized and fed to the membrane module 1, and sent from the membrane module 1 as the moisturized air (see the arrow F19). The moisturized air is fed through the suction manifold 72 to the combustion chamber 73 of the internal combustion engine. Then, the moisturized air passes through the discharge manifold 74, and the discharge air is discharged to the outside of the system from the direction of an arrow F20. The water used for moisturization, i.e., the warm water in a warm water bath 75 is fed by a circulating water pump 76 to the membrane module 1 (see an arrow F21), and circulated within the system (see an arrow F22). The configuration of the apparatus for reducing the nitrogen oxide according to the present embodiment may be any configuration including the above configuration, and can be properly designed according to application of the internal combustion engine, the environment in use and the like.

In FIG. 10, as an example of the membrane module, the membrane module 1 shown in FIG. 1 is used, but the internal combustion engine according to the present embodiment will not be limited to embodiments using the membrane module above. For example, instead of the membrane module 1, the membrane modules 51 and 52 shown in FIG. 8 are used, or the membrane module 6 (membrane module having a moisturizing nitrogen-enriching membrane) shown in FIG. 9 is used. Thereby, the air not only moisturized but also nitrogen-enriched can be fed to the combustion chamber of the internal combustion engine.

The feed air used for operation of the internal combustion engine, the feed air balance is preferably high. Here, the feed air balance is increase/decrease of the flow rate ($m^3$/min) of the air caused by moisturization or nitrogen enrichment, and is determined by the following expression:

Feed air balance (%)=(flow rate of the moisturized and/or nitrogen-enriched air−flow rate of the air fed)/flow rate of the air fed Namely, if the flow rate of the air is increased by moisturization and/or nitrogen enrichment, the feed air balance has a positive value. Specifically, in the present embodiment, the feed air balance is preferably −40% or more. The feed air balance is more preferably −15% or more, more preferably −10% or more, still more preferably 0% or more, still more preferably 10% or more, and further still more preferably 15% or more. At a feed air balance of the moisturized and/or nitrogen-enriched air in the range, energy efficiency can be further improved.

EXAMPLES

According to Examples below, the present invention will be described more in detail, but the present invention will not be limited by Examples below.

Example 1

Figure 11:
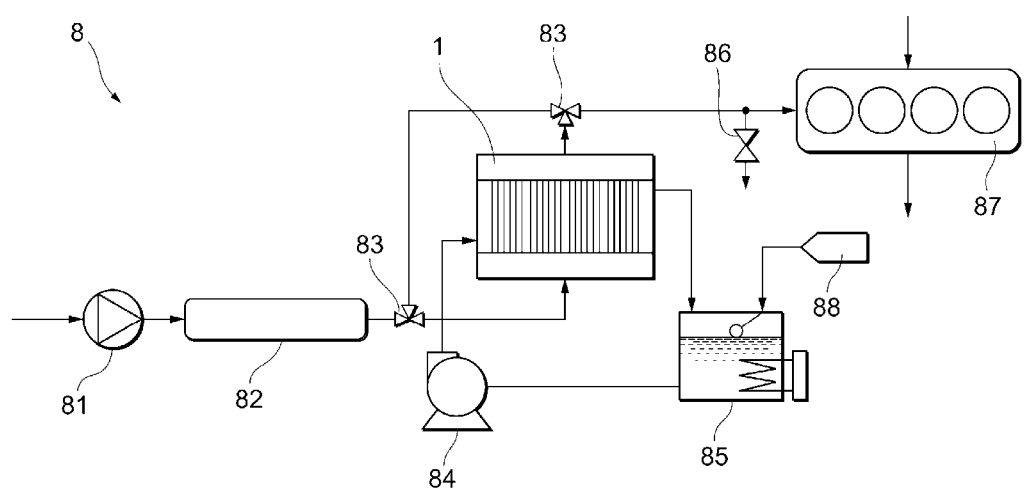
FIG. 11 shows a conceptual view of an internal combustion engine apparatus used in Examples.

An internal combustion engine apparatus 8 shown in FIG. 11 was operated, and the concentration of NOx in the exhaust gas was measured. The relationship between the amount of the feed air to be moisturized and the amount of NOx to be produced was examined. The internal combustion engine apparatus 8 has a compressor 81, a temperature adjuster 82, a three-way valve 83, a warm water circulation pump 84, a warm water producer 85, the membrane module 1 (see FIG. 4), a sampling valve 86, and a diesel engine 87 connected to one another.

The membrane module 1 is a hollow fiber type membrane module that can perform moisturization. A membrane element mounted on the membrane module 1 was produced as follows: an outer side of a polyethersulfone hollow fiber ultrafiltration membrane (UF membrane) having an inner diameter of 0.7 mmφ and an outer diameter of 1.0 mmφ as a support layer was coated with a fluororesin-based "Teflon (registered trademark) AF1600" (made by E. I. du Pont de Nemours and Company) as a steam permeable membrane, and the coated membrane was twill wound around a core bar. The membrane element had a membrane area per membrane element of 10 m², and had a cylindrical shape having an outer diameter of 175 mmφ and a length of 430 mm. Four membrane elements were used. The steam permeable membrane (Teflon AF1600) had a water absorbing rate of not more than 0.01%, and a contact angle to the water of 104°. The water absorbing rate was measured according to ASTM 570 under the condition that a sample was immersed into 23° C. water for 24 hours. The contact angle to the water was measured as follows: water droplets of deionized water were disposed on the surface of the sample, and left at 23° C. for 1 minute; subsequently, using a contact angel measuring apparatus (made by Kyowa Interface Science Co., Ltd., a CA-X150 contact angle meter), measurement was performed.

The specification of the diesel engine was a rating of 2400 rpm (at a load of 100%), an output of 103 kW, a bore of 110 mm, a stroke of 125 mm, and $P_{max}$ of 1.08 Mpa. A light oil fuel was used. The engine was operated according to the E3 test cycle specified in "Technical Code on Control of Emission of Nitrogen Oxides from Marine Diesel Engines (2008)" (Nippon Kaiji Kyokai).

The air pressurized by the compressor 81 was fed into the membrane module 1 (the air feeding port). Tap water for moisturization was circulated on the outer side of the membrane module 1. The pressure of the air at an inlet port of the membrane module 1 was kept at 136 kPaG (gauge pressure) and a temperature thereof was kept at 77° C. The concentration of oxygen in the air at the inlet port (air feeding port) of the membrane module 1 was 20.9%. The concentration of oxygen was measured using an oxygen concentration meter (made by JIKCO, Ltd., JKO-25LJII).

The pressure of the air at an outlet port of the membrane module 1 was 65 kPaG (gauge pressure), and the temperature at an inlet port for warm water in the membrane module was 74° C. In order to verify the moisturizing effect, the pressure of the inlet port for water was 183 kPaG (gauge pressure) so that the pressurized air did not permeate through the membrane. The air discharged from the membrane module 1 was adjusted at a temperature of 59° C., a concentration of oxygen of 18.9 mol %, and a steam concentration of 9.7 mol %, and fed to the diesel engine on the condition of a load of 75%.

As a result, the amount of NOx to be produced was 3.24 g/kWh. Compared to Comparative Example 1 below (non-moisturized feed air), the amount of NOx to be produced was 76% reduced. Corrosion in the diesel engine by the test was not found.

Examples 2 to 4

In the same manner as in Example 1, the temperature and flow rate of the water were adjusted and operation was performed under the condition shown in Table 1. The result is shown in Table 1.

Comparative Example 1

Using the same apparatus as that in Example 1, the air from the compressor 81 was fed to the diesel engine at an output of 75% without passing through the membrane module 1. The amount of NOx to be produced was 13.26 g/kWh.

TABLE 1

| | Feed air balance (%) | Feed air composition (mol %) | | Engine load rate (%) | Feed air pressure (kPa) | Proportion of excessive oxygen λ | Water/fuel ratio ((g/s)/(g/s)) | Amount of NOx to be produced in engine discharge gas (g/kWh) | Feed air temperature (° C.) | Feed air humidity (% RH) |
|---|---|---|---|---|---|---|---|---|---|---|
| | | $O_2$ | $H_2O$ | | | | | | | |
| Example 1 | 16.8 | 18.9 | 9.7 | 75 | 65 | 1.86 | 1.87 | 3.24 | 59.1 | 84.7 |
| Example 2 | 13.0 | 19.5 | 7.8 | 75 | 65 | 1.97 | 1.54 | 4.06 | 55.0 | 82.9 |
| Example 3 | 10.8 | 20.1 | 5.3 | 75 | 65 | 2.12 | 1.09 | 6.70 | 46.5 | 85.0 |
| Example 4 | 6.7 | 20.5 | 3.8 | 75 | 65 | 2.25 | 0.81 | 7.74 | 38.7 | 91.7 |
| Comparative Example 1 | 7.2 | 20.7 | 0.7 | 75 | 65 | 2.25 | 0.16 | 13.26 | 40.8 | 15.8 |

In Table 1, the feed air balance was calculated based on the following expression. In the measurement of the air balance, the flow rate of the moisturized air was the flow rate of the air that has passed through the membrane module, and the flow rate of the air fed was the flow rate of the air immediately after the air was pressurized by the compressor 81.

Feed air balance (%)=(flow rate of the moisturized and/or nitrogen-enriched air−flow rate of the air fed)/flow rate of the air fed The engine load rate means the number of rotation of the engine, which indicates the rate of the number of rotation of the engine to be increased based on the maximum number of rotation. The feed air pressure means the pressure of the moisturized (and/or nitrogen-enriched) air to be fed to the engine. The proportion of excessive oxygen is the ratio (proportion) of the amount of oxygen in the fed suction air based on the amount of oxygen to be needed to combust the fuel. The water/fuel mixing ratio means a feeding rate (g/s) of the amount of the water in the fed suction air based on the feeding rate (g/s) of the fuel fed to the engine. The feed air temperature means a temperature of the moisturized (and/or nitrogen-enriched) air to be fed to the engine.

In all Examples, the tap water was switched to the sea water in a sea water tank 88 (artificial sea water was used: made by Nihon Pharmaceutical Co., Ltd., 36 of "Daigo's Artificial Seawater SP" was mixed based on 1000 of the tap water (mass ratio)) halfway and circulated. The air was moisturized and fed to the diesel engine (the flow rate and temperature of the sea water were adjusted so that the humidity of the air was the same as that in the tap water in Examples.). The content of sodium chloride in "Daigo's Artificial Seawater SP" was 20747 mg/L. In both cases of the tap water and sea water, after the test was performed, corrosion in the diesel engine by the test was not found. Even if the warm sea water was used, no sodium chloride was found in the water obtained by sampling part of the moisturized air and condensing the steam.

Example 5

Figure 12:
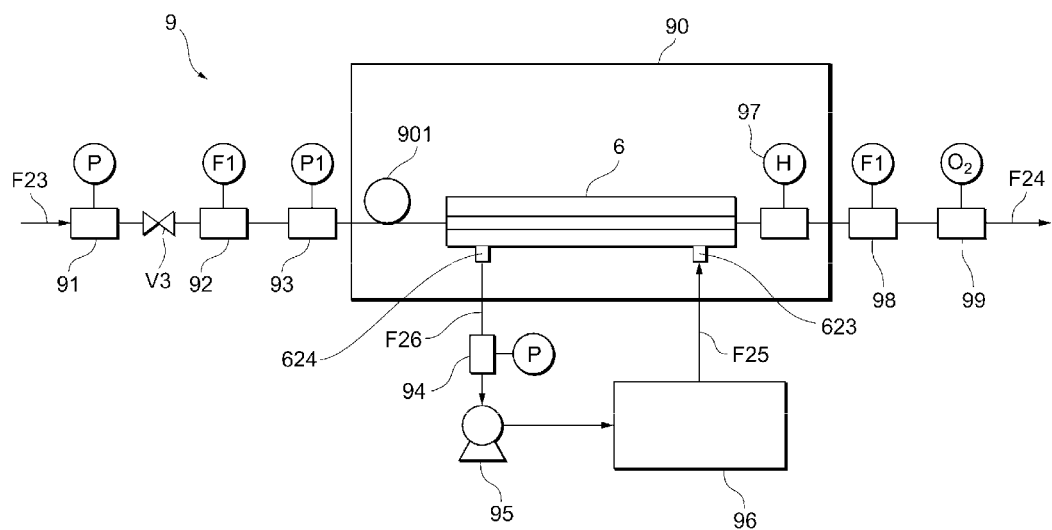
FIG. 12 shows a conceptual view of an apparatus for reducing a nitrogen oxide from an internal combustion engine used in Examples.

An apparatus for reducing a nitrogen oxide 9 shown in FIG. 12 was operated, and the moisturized and nitrogen-enriched air was produced. The apparatus for reducing the nitrogen oxide 9 included the membrane module 6 (see FIG. 9). A pressure reducing valve 91, a valve V3, a flow meter 92, a pressure gauge 93, and a heat exchanger 901 for controlling the temperature of the fed air, which was a 3 mmφ stainless steel tube wound into a loop, were connected to the air feeding port (not illustrated) in the membrane module 6. A hygrometer 97, a flow meter 98, and an oxygen concentration meter 99 were connected to the air discharging port 622 (not illustrated) of the membrane module 6. The heat exchanger 901, the membrane module 6, and the hygrometer 97 were provided within a thermostat 90. In the thermostat 90, the temperature was kept so that the temperature was constant. The heat exchanger 901 controlled so that the temperature of the air to be fed to the membrane module 6 was the same as that of the thermostat 90. A circulating water pressure gauge 94, a circulating water pump 95, and a warm water bath 96 that could control the temperature were connected between the water feeding port 623 and the water discharging port 624 in the membrane module 6. The pressurized air was fed to the air treating apparatus 9 from the direction of an arrow F23, passed through the membrane module 6, and was taken out from the direction of an arrow F24 as the moisturized nitrogen-enriched air. The water for moisturization, i.e., the warm water in the warm water bath 96 was fed by the circulating water pump 95 to the membrane module 6 from the direction of an arrow F25, and circulated toward the arrow F25.

The membrane module 6 was a hollow fiber type membrane module that could perform moisturization and nitrogen enrichment. As the membrane element mounted on the membrane module 6, a membrane element was used in which a polyethersulfone hollow fiber ultrafiltration membrane (UF membrane) having an inner diameter of 0.7 mmφ and an outer diameter of 1 mmφ as a support layer was coated with a fluororesin-based "Teflon (registered trademark) AF1600" (made by E. I. du Pont de Nemours and Company). The membrane module 6 had an effective membrane area of 6.6 cm$^2$, an oxygen permeating rate of 1,281 GPU, nitrogen permeating rate of 543 GPU. Here, the effective membrane area means the surface area of the membrane. The oxygen permeating rate could be determined as follows: when a single gas of oxygen pressurized at a certain pressure was fed to the membrane, the flow rate (amount) of oxygen to permeate through the membrane per unit time was measured, and the amount of oxygen to permeate through the membrane per unit time was converted to the amount of oxygen to permeate through the membrane per unit pressure and per unit area of the membrane (for example, GPU=10$^{-6}$ cm$^3$ (STP)/cm$^2$/s/cmHg). Similarly, the nitrogen permeating rate was determined from the flow rate of nitrogen to permeate through the membrane when a single gas of nitrogen was fed to the membrane.

In the state where 40° C. warm water was allowed to flow through the air permeating region of the membrane module 6, the pressure and flow rate of the fed air and the flow rate of the circulating water were changed. The concentration of oxygen, temperature, and humidity of the obtained moisturized and nitrogen-enriched air were measured. The oxygen concentration meter 99 used was a JKO-25LJII made by JIKCO, Ltd., and the hygrometer 97 used was an HYGROPLM2 made by SHINYEI Technology Co., Ltd. The result and operation condition in Example 5 are shown in Table 2.

Examples 6 to 14

The test was performed in the same manner as in Example 5 except that as the condition on the circulating water to be fed to the air permeating region of the membrane module 6 and the condition on the fed air, the temperature shown in Table 2 was used. The concentration of oxygen, temperature, and humidity of the obtained moisturized and nitrogen-enriched air were measured. The operation condition and result of each of Examples are shown in Table 2.

TABLE 2

| | | Warm water | | Fed air | | Feed air | | | |
|---|---|---|---|---|---|---|---|---|---|
| | | Thermostat temperature ° C. | Temperature ° C. | Flow rate mL/min | Flow rate mL/min | Pressure kPa | Flow rate mL/min | Temperature ° C. | Humidity % RH | O$_2$ concentration % |
| Example | 5 | 24 | 24 | 30.3 | 126.7 | 102 | 118.5 | 24.9 | 79 | 19.8 |
| | 6 | 24 | 27 | 35.9 | 128.7 | 100 | 121.6 | 26.9 | 92 | 19.9 |
| | 7 | 40 | 30 | 94.9 | 113.3 | 100 | 105.4 | 39.7 | 59 | 20.2 |
| | 8 | 40 | 40 | 94.9 | 113.3 | 100 | 105.5 | 40.1 | 84 | 20.2 |
| | 9 | 40 | 50 | 105.2 | 105.9 | 100 | 101.4 | 39.1 | 93 | 20.2 |
| | 10 | 40 | 40 | 254.0 | 114.4 | 200 | 96.3 | 39.7 | 86 | 19.0 |
| | 11 | 40 | 50 | 254.0 | 113.3 | 200 | 97.4 | 39.1 | 91 | 19.2 |
| | 12 | 70 | 70 | 97.8 | 109.9 | 99 | 94.1 | 73.9 | 73 | 19.6 |
| | 13 | 70 | 80 | 87.4 | 124.7 | 99 | 112.7 | 74.4 | 87 | 19.6 |
| | 14 | 70 | 80 | 170.8 | 134.7 | 200 | 106.5 | 74.8 | 87 | 18.7 |

Examples 15 and 16

Figure 13:
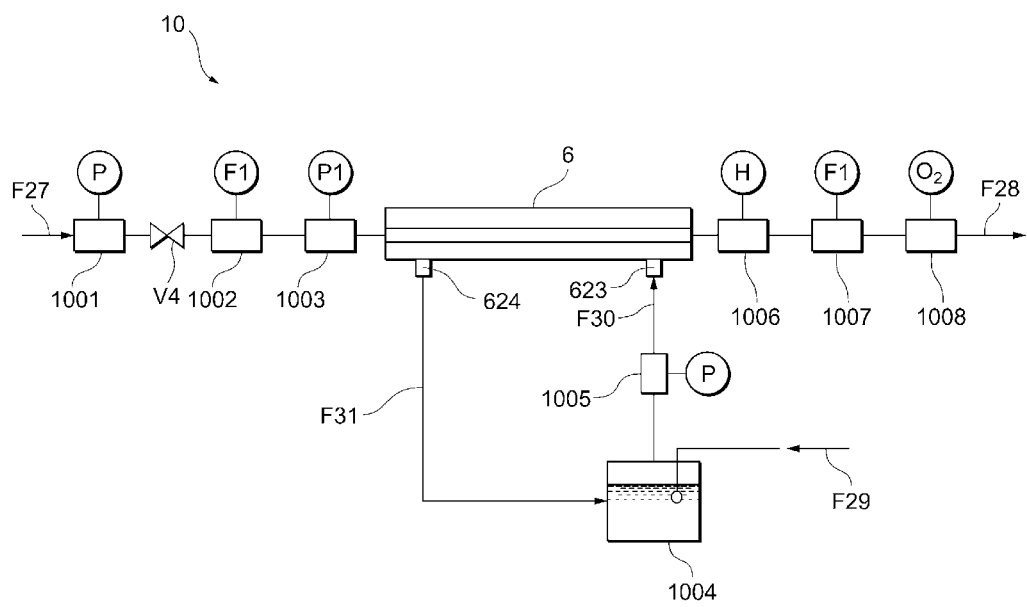
FIG. 13 shows a conceptual view of an apparatus for reducing a nitrogen oxide from an internal combustion engine used in Examples.

An apparatus for reducing a nitrogen oxide 10 shown in FIG. 13 was operated, and the moisturized and nitrogen-enriched air was produced. In the apparatus for reducing the nitrogen oxide 10, steam was used as a circulating water system, and air was used as a carrier of the steam. The apparatus for reducing the nitrogen oxide 10 included the membrane module 6 above (see FIG. 9). A pressure reducing valve 1001, a valve V4, a flow meter 1002, and a pressure gauge 1003 were connected to the air feeding port (not illustrated) of the membrane module 6. A hygrometer 1006, a flow meter 1007, and an oxygen concentration meter 1008 were connected to the air discharging port (not illustrated) of the membrane module 6. A warm water bath with a bubbler 1004 and a circulating water pressure gauge 1005 were connected between the water feeding port 623 and the water discharging port 624 in the membrane module 6. The pressurized air was fed to the apparatus for reducing the nitrogen oxide 10 from the direction of an arrow F27, passed through the membrane module 6, and was taken out from the direction of an arrow F28 as the moisturized nitrogen-enriched air. The steam was produced in the warm water bath with a bubbler 1004, and the air was fed as the carrier of the steam (see an arrow F29). Thereby, the steam was fed to the membrane module 6 from the direction of an arrow F30, and allowed to flow toward the direction of an arrow F31 to circulate within the system.

The test was performed in the same manner as in Example 5 using the apparatus for reducing the nitrogen oxide 10 except that using the air as the carrier, the steam was allowed to flow on the circulation side of the membrane module 6. The concentration of oxygen, temperature, and humidity of the obtained moisturized nitrogen-enriched air were measured. The operation condition and result in each of Examples are shown in Table 3.

Comparative Examples 2 and 3

The test was performed in the same manner as in Example 5 except that no water was fed to the membrane module 6, the air in the air permeating region of the membrane module 6 had room temperature, and compressed air was allowed to flow through the air permeating region under atmospheric pressure. The concentration of oxygen, temperature, and humidity of the nitrogen-enriched air obtained by the air treating apparatus were measured. The operation condition and result in each of Comparative Examples are shown in Table 3.

of moisturization and nitrogen enrichment to reduction of nitrogen oxides and contribution of moisturization to reduction of nitrogen oxides, a membrane module for nitrogen enrichment and a membrane module for moisturization were separately prepared, and the measurement was performed.

The internal combustion engine apparatus 11 included membrane modules 1101, 1102, and 1103. The membrane module group was divided into two groups of a front module group (membrane modules 1101 and 1102) and a rear module group (module 1103). The front module group mainly performed nitrogen enrichment, and the rear module group mainly performed moisturization.

A compressor 1104 having a suction air valve A was connected via a valve B to the membrane modules 1101 and 1102, and further connected via valves C and D to a suction air system temperature adjuster 1106. From there, the compressor 1104 was connected via a valve E to the membrane module 1103, and connected via a valve F to an engine 1105. Each of the membrane modules 1101 and 1102 was connected via a valve H to an air sweep blower 1108. The oxygen-enriched air permeated through the membrane was discharged via a valve I to the outside. The air sweep blower 1108 has a valve G. The warm water having a temperature adjusted by a warm water bath 1109 was fed by a water pump 1107 via a valve K to the membrane module 1103. The warm water was again sent via a valve J to the warm water bath 1109. The tap water was fed via a valve L to the warm water bath 1109, and when necessary, the warm water was discharged via a valve M to the outside. The pressurized air was produced in the compressor 1104. The concentration of oxygen in the pressurized air was 20.9%. In the present Example, the feed air was produced by the external compressor other than the engine. In a system used in practice, a compressor such as a supercharger could be also used.

The pressurized air was mainly nitrogen-enriched in the membrane modules 1101 and 1102, and then mainly moisturized in the membrane module 1103. In the membrane module 1103, the warm water was fed to a secondary side of the membrane by the water pump 1107 to moisturize the air.

TABLE 3

| | | Steam/air | | | Fed air | | Feed air | | | |
| --- | --- | --- | --- | --- | --- | --- | --- | --- | --- | --- |
| | | Temperature °C. | Humidity % RH | Flow rate mL/min | Flow rate mL/min | Pressure kPa | Flow rate mL/min | Temperature °C. | Humidity % RH | $O_2$ concentration % |
| Example | 15 Steam | 26.7 | 89 | 132.8 | 102.7 | 98 | 88.8 | 25.7 | 65 | 18.6 |
| | 16 | 27.4 | 93 | 132.8 | 102.7 | 98 | 88.8 | 25.8 | 72 | 18.5 |
| Comparative | 2 Only | 24.5 | 50 | 0.0 | 101.8 | 97 | 82.1 | 23.9 | 21 | 20.0 |
| Example | 3 air | 24.5 | 50 | 190.0 | 101.8 | 97 | 82.1 | 24.0 | 21 | 18.8 |

From Tables 2 and 3, it was found that if the warm water or steam was circulated on the circulation side, the air having a high humidity and low concentration of oxygen (highly nitrogen-enriched) could be obtained. By control of the temperature of the warm water, the humidity of the obtained nitrogen-enriched air could be controlled. It was also found that the warm water having a lower circulation flow rate and higher temperature demonstrated a higher moisturizing and nitrogen-enriching ability.

Examples 17 to 34

Figure 14:
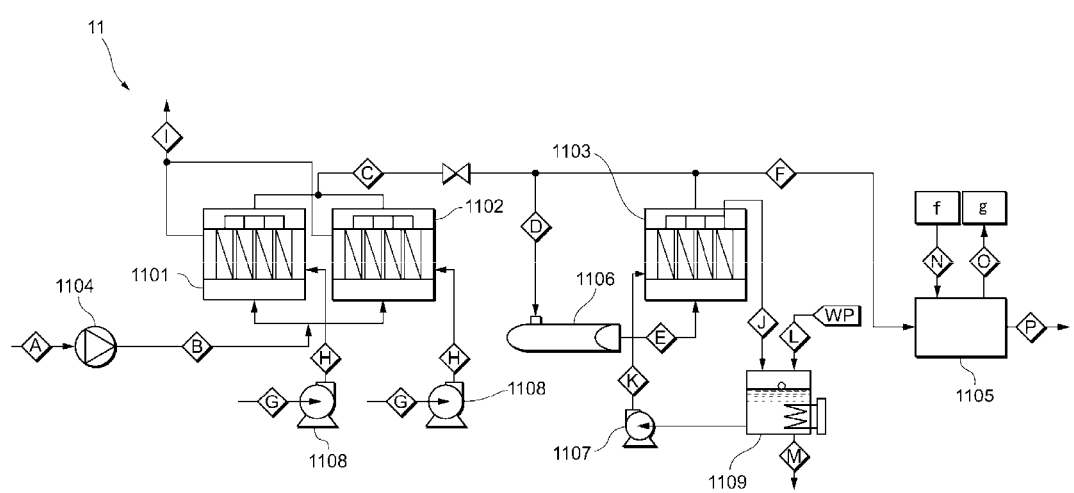
FIG. 14 shows a conceptual view of an internal combustion engine apparatus used in Examples.

An internal combustion engine apparatus 11 shown in FIG. 14 was operated, and the moisturized nitrogen-enriched air was produced and evaluated. In order to evaluate contribution A test was performed under the condition where the pressure on the secondary side was set at the same pressure as or slightly higher than the pressure on a primary side (air feeding side) to prevent the feed air from permeating to the secondary side in the membrane module 1103 for moisturization. As the water used for moisturization, the tap water was used. The tap water was circulated between the warm water bath 1109 and the membrane module 1103. In the moisturizing module, latent heat of vaporization of the water needed for moisturization needs to be supplied. The latent heat of vaporization was mainly supplied from the sensible heat of the circulating water.

The air nitrogen-enriched and moisturized in the membrane modules 1101, 1102, and 1103 was fed to the engine 1105. The engine 1105 was a 4-stroke engine (the specification of the engine was as follows: an S4M-MTK engine made by Mitsubishi Heavy Industries, Ltd., a light oil fuel used, an engine output of 103 kW, an engine speed of 2400 rpm, a cylinder bore of 110 mm, a piston stroke of 125 mm, and an average effective pressure of 1.08 MPa.). A fuel f was fed from a valve N to the engine 1105, and a discharge air g was discharged via a valve O to the outside of the engine 1105. A valve P was a valve for adjusting a pressure. The engine was operated according to the E3 test cycle specified in "Technical Code on Control of Emission of Nitrogen Oxides from Marine Diesel Engines (2008)" (NIPPON KAIJI KYOKAI).

Comparative Example 4

The test was performed in the same manner as in Example 17 except that without feeding water to the rear membrane module 1103, the rear membrane module 1103 had the air having room temperature, and the pressure of the air having room temperature was the same as or higher than that of the pressurized air so that the pressurized air did not permeate through the membrane. The concentration of oxygen, temperature, and humidity of the feed air obtained by the apparatus for reducing the nitrogen oxide were measured. The operation condition and result are shown in Table 4.

TABLE 4

| | Concentration of oxygen after nitrogen enrichment | Feed air balance | Feed air composition (mol %) | | Engine load rate | Feed air pressure | Proportion of excessive oxygen λ | Water/fuel ratio | Amount of NOx to be produced in engine discharge gas | Feed air temperature | Feed air humidity |
|---|---|---|---|---|---|---|---|---|---|---|---|
| | (mol %) | (%) | $O_2$ | $H_2O$ | (%) | (kPa) | | ((g/s)/(g/s)) | (g/kWh) | (%) | (% RH) |
| Example 17 | 18.1 | −24 | 18.1 | 2.1 | 25 | 25 | 3.01 | 0.68 | 3.91 | 29.7 | 64.2 |
| Example 18 | 18.3 | −22 | 18.3 | 2.2 | 25 | 15 | 2.74 | 0.64 | 4.12 | 29.5 | 61.7 |
| Example 19 | 16.3 | −75 | 16.2 | 2.2 | 25 | 25 | 2.65 | 0.70 | 1.56 | 33.4 | 53.2 |
| Example 20 | 16.5 | −61 | 16.3 | 2.2 | 50 | 51 | 2.18 | 0.57 | 1.59 | 33.0 | 66.9 |
| Example 21 | 16.3 | −63 | 16.2 | 2.5 | 50 | 47 | 2.08 | 0.63 | 1.41 | 33.1 | 74.4 |
| Example 22 | 17.2 | −30 | 17.2 | 2.3 | 75 | 80 | 2.15 | 0.56 | 2.30 | 29.9 | 96.8 |
| Example 23 | 17.1 | −32 | 17.1 | 2.3 | 75 | 75 | 2.07 | 0.54 | 2.20 | 30.4 | 92.4 |
| Example 24 | 17.1 | −31 | 16.8 | 4.0 | 75 | 74 | 1.95 | 0.91 | 1.83 | 39.9 | 96.3 |
| Example 25 | 18.1 | −24 | 18.1 | 3.0 | 75 | 75 | 2.13 | 0.69 | 3.39 | 37.1 | 83.2 |
| Example 26 | 18.1 | −18 | 16.9 | 9.0 | 75 | 75 | 1.82 | 1.89 | 1.32 | 57.4 | 89.6 |
| Example 27 | 20.0 | 0.0 | 18.4 | 9.8 | 75 | 75 | 1.96 | 2.03 | 2.41 | 60.5 | 84.3 |
| Example 28 | 19.5 | −7.0 | 17.8 | 10.2 | 75 | 80 | 1.95 | 2.17 | 1.62 | 62.2 | 83.7 |
| Example 29 | 19.6 | −7.2 | 18.5 | 7.1 | 75 | 80 | 2.09 | 1.56 | 2.91 | 54.8 | 82.6 |
| Example 30 | 20.0 | −5.6 | 18.9 | 7.3 | 75 | 75 | 2.06 | 1.56 | 3.24 | 54.8 | 82.7 |
| Example 31 | 20.1 | −10.3 | 19.3 | 5.2 | 75 | 75 | 2.18 | 1.14 | 4.69 | 47.0 | 86.0 |
| Example 32 | 19.5 | −13.5 | 18.7 | 5.3 | 75 | 80 | 2.17 | 1.19 | 3.73 | 47.8 | 86.2 |
| Example 33 | 19.6 | −12.5 | 19.1 | 3.7 | 75 | 80 | 2.28 | 0.85 | 4.69 | 40.0 | 89.8 |
| Example 34 | 20.0 | −11.5 | 19.5 | 3.7 | 75 | 75 | 2.29 | 0.84 | 5.51 | 39.4 | 90.7 |
| Comparative Example 4 | 21.0 | 7.2 | 20.7 | 0.7 | 75 | 65 | 2.25 | 0.16 | 13.26 | 40.8 | 15.8 |

The membrane element mounted on the membrane modules 1101, 1102, and 1103 was a hollow fiber type having a surface area of 10 m². Two pairs of four membrane elements, i.e., eight membrane elements were used in the front membrane module, and four membrane elements were used in the rear membrane module. The membrane elements used were a hollow fiber type membrane element. As the nitrogen-enriching membrane of the hollow fiber type membrane element, a membrane element was used in which a polyethersulfone hollow fiber ultrafiltration membrane (UF membrane) having an outer diameter of 1 mmφ was coated with a fluororesin-based "Teflon (registered trademark) AF1600" (made by E. I. du Pont de Nemours and Company). The respective membrane elements used in the membrane modules 1101, 1102, and 1103 had an effective membrane area of 10 cm², an oxygen permeating rate of 1,100 GPU, and a nitrogen permeating rate of 450 GPU.

The concentration of oxygen in the air immediately after being nitrogen-enriched by the membrane modules 1101 and 1102, the composition and pressure of the feed air moisturized by the membrane module 1103 and fed to the engine, and the amount of nitrogen oxides to be produced in the engine discharge air were measured. As an oxygen concentration meter, a JKO-25LJII made by JIKCO, Ltd. was used. As a hygrometer, an HYGROPLM2 made by SHINYEI Technology Co., Ltd. was used. The operation condition and result of each of Examples are shown in Table 4.

From Table 4, it was found that if the warm water or steam was circulated, the air having a high humidity and low concentration of oxygen (highly nitrogen-enriched) could be obtained. By control of the temperature of the warm water, the humidity of the obtained feed air could be controlled. It was also found that in the feed air composition, feed air having a higher content of $H_2O$ can reduce a larger amount of NOx. Table 4 shows that Examples 51 and 52 had a higher effect of reducing nitrogen and a higher feed air balance. In each of Examples, the tap water was switched to the sea water (artificial sea water was used: made by Nihon Pharmaceutical Co., Ltd., the sea water in which 36 of "Daigo's Artificial Seawater SP" was mixed based on 1000 of the tap water (mass ratio).) halfway and circulated. The air was moisturized and fed to the engine (the humidity of the pressurized air was adjusted so as to have the same humidity as that in the case of using the tap water, and operation was performed). In both cases of the tap water and the sea water, corrosion in the engine was not found.

Example 35

Operation was performed in the same manner as in Example 17 except that for the front membrane module, the hollow fiber type membrane module was replaced by a flat sheet membrane module. Further, particulate matter was measured. The concentration of the particulate matter (PM) was measured according to JIS B 8003-1:2009 the method described in Maeda et al., "Influence of Dilution Ratio on PM Emission Data," Journal of the JIME Vol. 38, No. 8; Maeda et al., "Measurement of PM Emission from Marine Diesel Engines." The result is shown in Table 5.

TABLE 5

| | Concentration of oxygen | Feed air balance | Engine load rate | Feed air pressure | Feed air temperature | Feed air humidity | Feed air composition [mol %] | | Amount of NOx to be produced in engine discharge gas | PM |
|---|---|---|---|---|---|---|---|---|---|---|
| | [mol %] | [%] | [%] | [kPa] | [° C.] | [% RH] | $O_2$ | $H_2O$ | [g/kWh] | [g/kWh] |
| Example 35 | 20.0 | 4 | 75 | 75 | 76.6 | 60.1 | 18.9 | 8.7 | 2.53 | 1.68 |

As shown in Table 5, according to the present Example, it was found that the amount of NOx to be produced in the engine discharge gas was small, the feed air balance was high, and the concentration of the particulate matter (PM) was low.

This application is based on Japanese Patent Application No. 2009-126745, filed on May 26, 2009 with Japan Patent Office, Japanese Patent Application No. 2010-076269, filed on Mar. 29, 2010 with Japan Patent Office, and Japanese Patent Application No. 2010-079686, filed on Mar. 30, 2010 with Japan Patent Office, and the subjects of which are incorporated herein by reference.

INDUSTRIAL APPLICABILITY

The method for reducing the nitrogen oxide from the internal combustion engine, membrane module, apparatus for reducing the nitrogen oxide from the internal combustion engine using the membrane module, and internal combustion engine apparatus according to the present invention can be used in a variety of fields such as diesel engines.

REFERENCE SIGNS LIST

α, β, γ, 1, 2, 51, 52, 6, 1101, 1102, 1103 . . . Membrane module
α1, β1, γ1, 11, 21, 521 . . . Steam permeable membrane
12, 22, 512, 522, 62 . . . Housing
121, 221, 513, 523, 621 . . . Air feeding port
122, 222, 514, 524, 622 . . . Air discharging port
123, 223, 525, 623 . . . Water feeding port
124, 224, 526, 624 . . . Water discharging port
3, 4, 5, 9, 10 . . . Apparatus for reducing nitrogen oxide
31, 41, 1006 . . . Thermometer
32, 42, 93, 1003 . . . Pressure gauge
33, 43, 92, 98, 1002, 1007 . . . Flow meter
34, 44, 97 . . . Hygrometer
35, 45, 99, 1008 . . . Oxygen concentration meter
36, 46, 75, 96, 1109 . . . Warm water bath
37, 47, 76, 95 . . . Circulating water pump
38, 48 . . . Circulating water flow meter
39, 49, 94, 1005 . . . Circulating water pressure gauge
511 . . . Nitrogen-enriching membrane
515 . . . Sweeping air feeding port
516 . . . Sweeping air discharging port
61 . . . Moisturizing nitrogen-enriching membrane
7, 8, 11 . . . Internal combustion engine apparatus
71 . . . Turbocharger
72 . . . Suction manifold
73 . . . Combustion chamber of internal combustion engine
74 . . . Discharge manifold
81, 1104 . . . Compressor
82 . . . Temperature adjuster
83 . . . Three-way valve
84 . . . Warm water circulation pump
85 . . . Warm water producer
86 . . . Sampling valve
87 . . . Diesel engine
88 . . . Sea water tank
90 . . . Thermostat
901 . . . Heat exchanger
91, 1001 . . . Pressure reducing valve
1004 . . . Warm water bath with bubbler
1105 . . . Engine
1106 . . . Suction air system temperature adjuster
1107 . . . Water pump
1108 . . . Air sweep blower
V1, V2, V3, V4, A, B, C, D, E, F, G, H, I, J, K, L, M, N, O, P . . . Valve
a1, a2, a6 . . . First space
b1, b2, b6 . . . Second space

What is claimed is:

1. A method for reducing a nitrogen oxide in an exhaust gas from an internal combustion engine, the method comprising:
a step of bringing pressurized air into contact with one surface of a steam permeable membrane, and allowing liquid water to flow along the other surface of the steam permeable membrane to moisturize the pressurized air; and
a step of introducing the moisturized air into the internal combustion engine,
wherein the direction of the air flowing over the one surface of the steam permeable membrane is opposed to the direction of the water flowing over the other surface of the steam permeable membrane, and
wherein the water is pressurized at a pressure equal to or higher than that applied to the pressurized air.

2. The method for reducing the nitrogen oxide according to claim 1, further comprising a step of nitrogen-enriching the air using a nitrogen-enriching membrane.

3. The method for reducing the nitrogen oxide according to claim 2, wherein a concentration of oxygen in the nitrogen-enriched and moisturized air is not more than 20 mol %.

4. The method for reducing the nitrogen oxide according to claim 1, wherein the steam is allowed to flow by an exhaust gas discharged from the internal combustion engine.

5. The method for reducing the nitrogen oxide from an internal combustion engine according to claim 1, wherein the water comprises an electrolyte.

6. The method for reducing the nitrogen oxide from an internal combustion engine according to claim 1, wherein the water comprises sodium chloride.

7. The method for reducing the nitrogen oxide according to claim 1, wherein a temperature of the water is −10° C. to +30° C. of a temperature of the pressurized air.

8. The method for reducing the nitrogen oxide according to claim 1, wherein a content of water in the moisturized air or the nitrogen-enriched moisturized air is not less than 1 mol %, and a humidity of the moisturized air is less than 100% RH.

9. The method for reducing the nitrogen oxide according to claim 1, wherein the water is circulated and used.

10. A method for reducing a nitrogen oxide in an exhaust gas from an internal combustion engine, the method comprising:

a step of bringing pressurized air into contact with one surface of a moisturizing nitrogen-enriching membrane to nitrogen-enrich the pressurized air, and allowing liquid water to flow along the other surface of the moisturizing nitrogen-enriching membrane to moisturize the pressurized air; and a step of introducing the nitrogen-enriched and moisturized air into the internal combustion engine, wherein the direction of the pressurized air flowing over the one surface of the moisturizing nitrogen-enriching membrane is opposed to the direction of the water flowing over the other surface of the moisturizing nitrogen-enriching membrane, and wherein the water is pressurized at a pressure equal to or higher than that applied to the pressurized air.

11. The method for reducing the nitrogen oxide according to claim 10, wherein a pressure in a region through which the water flows is reduced to allow the water to flow.

12. A membrane module comprising a nitrogen-enriching membrane, and a housing that accommodates the steam permeable membrane, wherein an inside of the housing is partitioned by the nitrogen-enriching membrane to form a first space and a second space; and the housing comprises:

an air feeding port that feeds air to the first space;

an air discharging port that discharges the air from the first space;

a water feeding port that feeds liquid water to the second space; and a water discharging port that discharges the water from the second space, wherein the air feeding port, the air discharging port, the water feeding port and the water discharging port are configured such that the direction of the air flowing over the one surface of the membrane is opposed to the direction of the water flowing over the other surface of the membrane, wherein the water is pressurized at a pressure equal to or higher than that applied to the air.

13. The membrane module according to claim 12, wherein the membrane module is a hollow fiber membrane type membrane module or a flat sheet membrane type membrane module.

14. An apparatus for reducing a nitrogen oxide from an internal combustion engine, the apparatus comprising:

a membrane module according to claim 12;

an air feeding portion that feeds pressurized air to the air feeding port of the membrane module; and a water feeding portion that feeds liquid water to the water feeding port of the membrane module; wherein the air feeding port and the water feeding port are configured such that the direction of the air flowing over the one surface of the membrane is opposed to the direction of the water flowing over the other surface of the membrane and;

treated air discharged from the air discharging port of the membrane module is fed to a combustion chamber of the internal combustion engine, wherein the water is pressurized at a pressure equal to or higher than that applied to the pressurized air.

15. The apparatus for reducing the nitrogen oxide from an internal combustion engine according to claim 14, wherein the water feeding portion has a liquid transfer portion that feeds the water discharged from the water discharging port of the membrane module again to the water feeding port of the membrane module.

16. The apparatus for reducing the nitrogen oxide from an internal combustion engine according to claim 14 or 15, the apparatus further comprising:

a temperature control unit that controls a temperature of the water; and a flow rate control unit that controls a flow rate of the water.

17. An internal combustion engine apparatus comprising:

an apparatus for reducing a nitrogen oxide from an internal combustion engine according to claim 14 or 15; and a combustion chamber to which the treated air treated by the apparatus for reducing the nitrogen oxide is fed.

* * * * *